US012669737B2

(12) United States Patent
Kim

(10) Patent No.: US 12,669,737 B2
(45) Date of Patent: Jun. 30, 2026

(54) CAMERA ACTUATOR, AND CAMERA DEVICE COMPRISING SAME

(71) Applicant: LG INNOTEK CO., LTD., Seoul (KR)

(72) Inventor: Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 159 days.

(21) Appl. No.: 18/293,594

(22) PCT Filed: Aug. 8, 2022

(86) PCT No.: PCT/KR2022/011767
§ 371 (c)(1),
(2) Date: Jan. 30, 2024

(87) PCT Pub. No.: WO2023/018143
PCT Pub. Date: Feb. 16, 2023

(65) Prior Publication Data
US 2024/0345450 A1      Oct. 17, 2024

(30) Foreign Application Priority Data

Aug. 9, 2021     (KR) ........................ 10-2021-0104571

(51) Int. Cl.
  G03B 3/10          (2021.01)
  G03B 5/00          (2021.01)
(52) U.S. Cl.
  CPC ................. G03B 3/10 (2013.01); G03B 5/00 (2013.01); *G03B 2205/0046* (2013.01)
(58) Field of Classification Search
  CPC ...................................................... G03B 3/10
  See application file for complete search history.

(56) References Cited

U.S. PATENT DOCUMENTS

| | | | |
|---|---|---|---|
| 10,564,515 B2 * | 2/2020 | Shikama | ................... G03B 9/14 |
| 2022/0276462 A1 * | 9/2022 | Jang | .......................... G03B 5/00 |

FOREIGN PATENT DOCUMENTS

| | | | | |
|---|---|---|---|---|
| JP | 2018-120072 | 8/2018 | | |
| KR | 10-2019-0128279 | 11/2019 | | |
| KR | 10-2020-0015051 | 2/2020 | | |
| KR | 10-2020-0049907 | 5/2020 | | |
| KR | 10-2020-0119630 | 10/2020 | | |
| WO | WO-2021020738 A2 * | 2/2021 | ............... | G03B 5/00 |

OTHER PUBLICATIONS

International Search Report dated Nov. 10, 2022 issued in Application No. PCT/KR2022/011767.

* cited by examiner

*Primary Examiner* — Noam Reisner
(74) *Attorney, Agent, or Firm* — KED & ASSOCIATES

(57) ABSTRACT

A camera actuator, including a housing including a first side part and a second side part corresponding to the first side part; a first lens assembly and a second assembly lens which move in an optical axis direction on the basis of the housing; a driving part which moves the first lens assembly and the second lens assembly; a guide part which is disposed adjacent to at least one of the first side part or the second side part; and a ball located in the guide part. At least one of the first lens assembly or the second lens assembly includes a recess which faces the guide part and on which the ball is seated, and the recess may include a first stepped part disposed along an edge thereof and a second stepped part disposed inside the first stepped part.

10 Claims, 24 Drawing Sheets

<u>1000</u>

1200

D

D'

X
Z
Y

1251: 1251a, 1251b
1221: 1221a, 1221b, 1221c, 1221d
1222: 1222a, 1222b
1253: 1253a, 1253b

<u>1300</u>

LY1

X
Z
Y

CAMERA ACTUATOR, AND CAMERA DEVICE COMPRISING SAME

CROSS-REFERENCE TO RELATED PATENT APPLICATIONS

This application is a U.S. National Stage Application under 35 U.S.C. § 371 of PCT Application No. PCT/KR2022/011767, filed Aug. 8, 2022, which claims priority to Korean Patent Application No. 10-2021-0104571, filed Aug. 9, 2021, whose entire disclosures are hereby incorporated by reference.

TECHNICAL FIELD

The present invention relates to a camera actuator and a camera device including the same.

BACKGROUND ART

A camera is a device for taking pictures or videos by capturing images of subjects and is mounted on mobile devices, drones, vehicles, or the like. A camera device or a camera module may have an image stabilization (IS) function of correcting or preventing an image shake caused by a user's motion, an auto focusing (AF) function of aligning a focal length of a lens by automatically adjusting a distance between an image sensor and the lens, and a zooming function of capturing an image of a remote subject by increasing or decreasing the magnification of the remote subject through a zoom lens in order to improve the quality of the image.

Meanwhile, a pixel density of the image sensor increases as a resolution of the camera increases, and thus a size of the pixel becomes smaller, and as the pixel becomes smaller, the amount of light received for the same time decreases. Therefore, as the camera has a higher pixel density, the image shake caused by hand shaking due to a shutter speed decreased in a dark environment may more severely occur. As a representative IS technique, there is an optical image stabilizer (OIS) technique of correcting motion by changing a path of light.

According to a general OIS technique, the motion of the camera may be detected through a gyro sensor or the like, and a lens may tilt or move, or a camera device including a lens and an image sensor may tilt or move based on the detected motion. When the lens or the camera device including the lens and the image sensor tilts or moves for OIS, it is necessary to additionally secure a space for tilting or moving around the lens or the camera device.

Meanwhile, an actuator for the OIS may be disposed around the lens. In this case, the actuator for an OIS may include actuators, which are in charge of tilting of two axes perpendicular to an optical axis Z, that is, an actuator in charge of an X-axis tilting and an actuator in charge of a Y-axis tiling.

However, according to the needs of ultra-slim and ultra-small camera devices, there is a large space constraint for arranging the actuator for the OIS, and it may be difficult to ensure a sufficient space where the lens or the camera device including the lens and the image sensor itself may tilt or move for the OIS. In addition, as the camera has a higher pixel density, it is preferable that a size of the lens be increased to increase the amount of received light, and there may be a limit to increasing the size of the lens due to a space occupied by the actuator for the OIS.

In addition, when the zooming function, the AF function, and the OIS function are all included in the camera device, there is a problem that an OIS magnet and an AF or zoom magnet are disposed close to each other to cause magnetic field interference.

In addition, there is a problem in that a lens moving with a long stroke for the AF function or zooming function does not move straight and it is difficult to drive due to a friction force.

DISCLOSURE

Technical Problem

The present invention is directed to providing a camera actuator and a camera module, which have improved straightness due to a ball by improving the uniformity of a recess with a groove structure of edges of a plurality of recesses.

In addition, the present invention is directed to providing a camera actuator and a camera module, which have improved flatness and straightness through a structure having an inner layer of a guide unit.

In addition, the present invention is directed to providing a camera actuator and a camera device, which have improved accuracy and operating efficiency even at a moving distance for auto focusing (AF) in order to implement high-magnification zoom.

In addition, the present invention is directed to providing a camera actuator and a camera device applicable to ultra-slim, ultra-small, and high-resolution cameras.

The objects of embodiments are not limited thereto and may also include objects or effects that may be identified from the configurations or embodiments to be described below.

Technical Solution

One aspect of the present invention provides a camera actuator including a housing including a first side portion and a second side portion corresponding to the first side portion, a first lens assembly and a second lens assembly that move in an optical axis direction with respect to the housing, a driving unit configured to move the first lens assembly and the second lens assembly, a guide unit disposed adjacent to at least one of the first side portion and the second side portion, and a ball positioned at the guide unit, wherein at least one of the first lens assembly and the second lens assembly includes a recess which faces the guide unit and in which the ball is seated, and the recess includes a first stepped portion disposed along an edge thereof, and a second stepped portion disposed inside the first stepped portion.

The first stepped portion may have a closed loop shape.

A maximum width of the first stepped portion may be larger than a maximum width of the second stepped portion.

The ball may include a first ball disposed on an upper side portion of the first lens assembly, and a second ball disposed on a lower side portion thereof.

The first ball and the second ball may be seated in the second stepped portion.

A height of the first stepped portion may be smaller than a height of the second stepped portion.

The first stepped portion may include a first side surface and a first bottom surface in contact with an inner side of the first side surface, and the second stepped portion may include a second side surface in contact with an inner side of the first bottom surface, and a second bottom surface in contact with an inner side of the second side surface.

The first side surface may surround the first bottom surface, the second side surface, and the second bottom surface.

A length of the recess in a longitudinal direction may be larger than a length thereof in a width direction.

The camera actuator may include protruding portions disposed in the longitudinal direction with the recess interposed therebetween.

The first lens assembly may include a first lens hole, the second lens assembly may include a second lens hole, and at least one lens may be disposed in each of the first lens hole and the second lens hole.

The driving unit may include a driving coil, and a driving magnet facing the driving coil, The driving coil may be disposed on sidewalls of the first side portion and the second side portion to which the guide unit is disposed adjacent.

The first ball and the second ball may be disposed between the first lens assembly and the guide unit.

The recess may include a first recess in which the first ball is seated, and a second recess in which the second ball is seated.

The first stepped portion may extend in at least one of a longitudinal direction or a width direction.

The guide unit may include a first layer inserted therein, and a second layer surrounding the first layer.

The guide unit may include a guide groove in which the first ball and the second ball are seated.

The first layer may be exposed at the guide groove.

The first layer may be positioned under the second layer in the guide groove.

Advantageous Effects

According to embodiments of the present invention, it is possible to implement a camera actuator and a camera module, which have improved straightness due to a ball by improving the uniformity of a recess with a groove structure of edges of a plurality of recesses.

In addition, it is possible to implement a camera actuator and a camera module, which have improved flatness and straightness through a structure having an inner layer of a guide unit.

In addition, it is possible to implement a camera actuator and a camera device, which have improved accuracy and operating efficiency even at a moving distance for auto focusing (AF) in order to implement high-magnification zoom.

In addition, it is possible to implement a camera actuator and a camera device applicable to ultra-slim, ultra-small, and high-resolution cameras.

In particular, it is possible to effectively arrange an actuator for an optical image stabilizer (OIS) even without increasing the overall size of the camera device.

According to the embodiments of the present invention, it is possible to achieve a precise OIS function by implementing an X-axis tilting and a Y-axis tilting with a stable structure without causing magnetic field interference between the X-axis tilting and the Y-axis tilting and having no magnetic field interference with an AF actuator or a zoom actuator.

According to the present invention, it is possible to implement a camera actuator and a camera device applicable to ultra-slim, ultra-small, and high-resolution cameras.

Various and beneficial advantages and effects of the present invention are not limited to the above-described contents and will be more readily understood in a process of describing specific embodiments of the present invention.

MODES OF THE INVENTION

Figure 1:
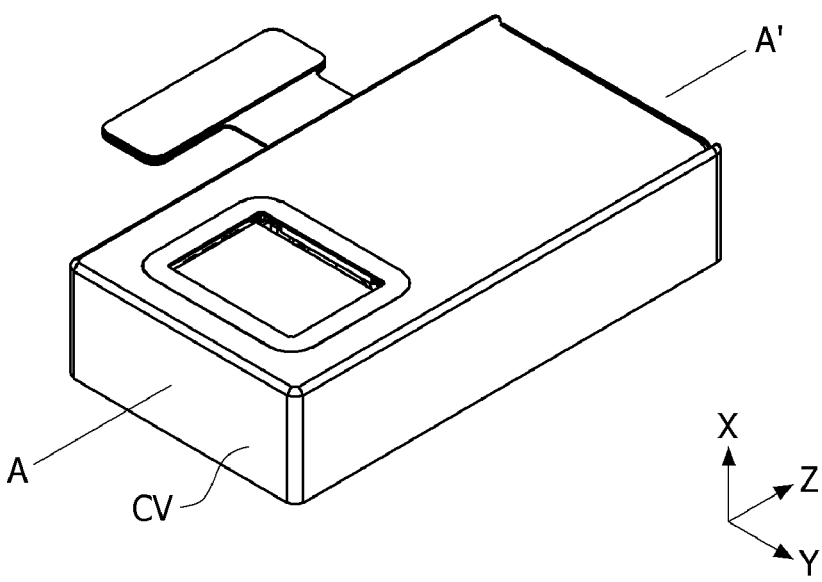
FIG. 1 is a perspective view of a camera device according to an embodiment.

Since the present invention may have various changes and various embodiments, specific embodiments are illustrated and described in the accompanying drawings.

However, it should be understood that this is not intended to limit the present invention to specific embodiments and includes all modifications, equivalents, and substitutes included in the spirit and technical scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The terms used in the application are only used to describe specific embodiments and are not intended to limit the present invention. The singular expression includes the plural expression unless the context clearly dictates otherwise. In the application, it should be understood that terms "comprise" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are denoted by the same reference numeral regardless of the reference numerals, and overlapping descriptions thereof will be omitted.

Figure 2:
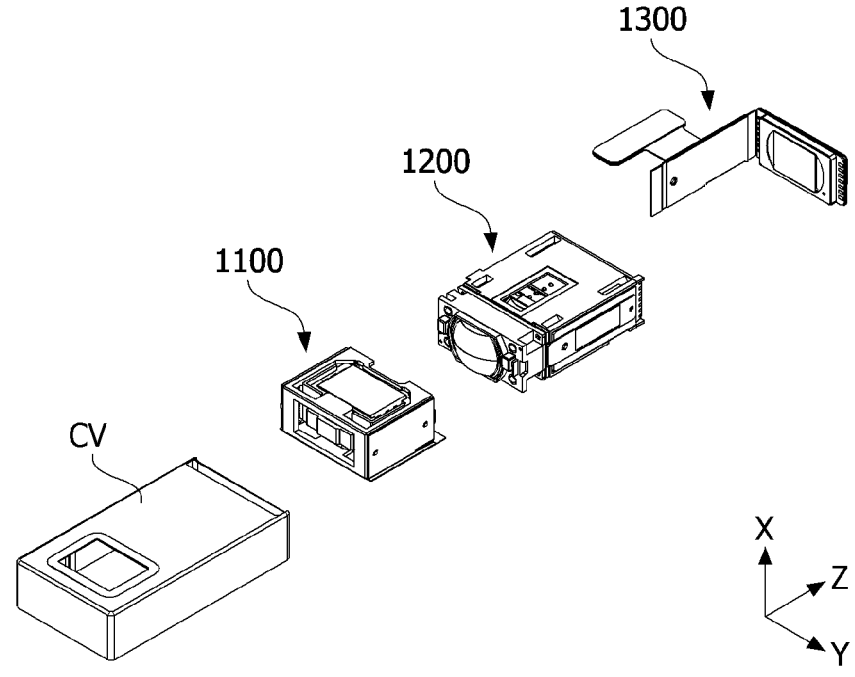
FIG. 2 is an exploded perspective view of the camera device according to the embodiment.
Figure 3:
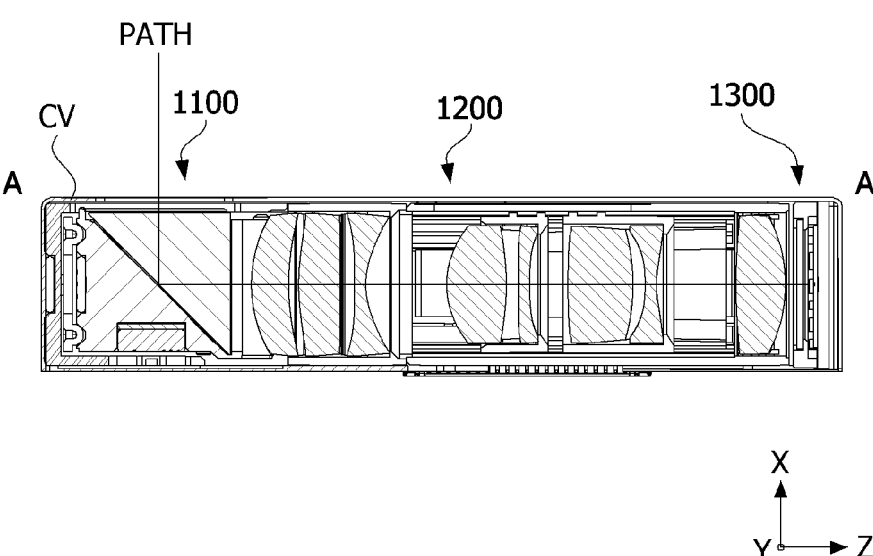
FIG. 3 is a cross-sectional view along line A-A' in FIG. 1.

FIG. 1 is a perspective view illustrating a camera device according to an embodiment, FIG. 2 is an exploded perspective view of the camera device according to the embodiment, and FIG. 3 is a cross-sectional view along line A-A' in FIG. 1.

Referring to FIGS. 1 and 2, a camera device 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and/or the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

In an embodiment, the first camera actuator 1100 may change an optical path. In an embodiment, the first camera actuator 1100 may vertically change the optical path through an internal optical member (e.g., a prism or a mirror). With this configuration, even when a thickness of a mobile terminal decreases, a configuration of a lens that is larger than the thickness of the mobile terminal is disposed in the mobile terminal so that zooming, auto focusing (AF), and OIS functions may be performed through the change in the optical path.

The first camera actuator 1100 may change the optical path from a first direction to a third direction. In the specification, an optical axis direction is the third direction or a Z-axis direction and corresponds to a traveling direction of light provided to an image sensor.

Additionally, the first camera actuator 1100 may include a fixed focal length lens disposed in a predetermined barrel (not illustrated). The fixed focal length lens may be referred to as "single focal length lens" or "single lens."

The second camera actuator 1200 may be disposed at a rear end of the first camera actuator 1100. The second camera actuator 1200 may be coupled to the first camera actuator 1100. In addition, the mutual coupling may be performed in any of various methods.

In addition, the second camera actuator 1200 may be a zoom actuator or an AF actuator. For example, the second camera actuator 1200 may support one or more lenses and perform an AF function or a zooming function by moving the lenses according to a predetermined control signal of a control unit.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

The circuit board 1300 may be connected to a second housing of the second camera actuator 1200 and may be provided with the image sensor. Furthermore, a base unit including a filter may be seated on the circuit board 1300. A description thereof will be made below.

The camera device according to the embodiment may be formed of one camera device or a plurality of camera devices. For example, the plurality of camera devices may include a first camera device and a second camera device. In addition, as described above, the camera device may be used interchangeably with "camera module," "camera device," "imaging device," "imaging module," "imaging machine," "optical machine," "optical apparatus," "optical device," or the like.

In addition, the first camera device may include one actuator or a plurality of actuators. For example, the first camera device may include the first camera actuator 1100 and the second camera actuator 1200.

In addition, the second camera device may include an actuator (not illustrated) disposed in a predetermined housing (not illustrated) and capable of driving a lens unit. Although the actuator may be a voice coil motor, a micro actuator, a silicon actuator, or the like and applied in various methods such as an electrostatic method, a thermal method, a bimorph method, and an electrostatic force method, the present invention is not limited thereto. In addition, in the specification, the camera actuator may be referred to as "actuator" or the like. In addition, the camera device formed of the plurality of camera devices may be mounted in various electronic devices such as a mobile terminal.

Referring to FIG. 3, the camera device according to the embodiment may include the first camera actuator 1100 for performing the OIS function and the second camera actuator 1200 for performing the zooming function and the AF function.

Light may enter the camera device through an opening area positioned in an upper surface of the first camera actuator 1100. In other words, the light may enter the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and enter an image sensor IS positioned at one end of the second camera actuator 1200 (PATH).

In the specification, a lower surface refers to one side in a first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the Z-axis direction in the drawings and may be used interchangeably with a third axis direction or the like. The third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. Detailed description thereof will be made below. In addition, hereinafter, the optical axis direction corresponds to the optical path and is the third direction (Z-axis direction) in the description of the first camera actuator 1100 and the second camera actuator 1200, and the following description will be made based on this.

In addition, with this configuration, the camera device according to the embodiment may resolve the spatial limitations of the first camera actuator and the second camera actuator by changing the optical path. In other words, the camera device according to the embodiment may extend the optical path while minimizing the thickness of the camera device in response to the change in the optical path. Furthermore, it should be understood that the second camera actuator may provide a high range of magnification by controlling a focus or the like in the extended optical path.

In addition, the camera device according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet and perform a high-magnification zooming function.

For example, although the first lens assembly and the second lens assembly may be moving lenses that move through the coil, the magnet, and the guide pin, and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF or zoom actuator are disposed according to the embodiment of the present invention, it is possible to prevent the magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS may be used interchangeably with terms such as hand shaking correction, optical image stabilization, optical image correction, or shaking correction.

Figure 4:
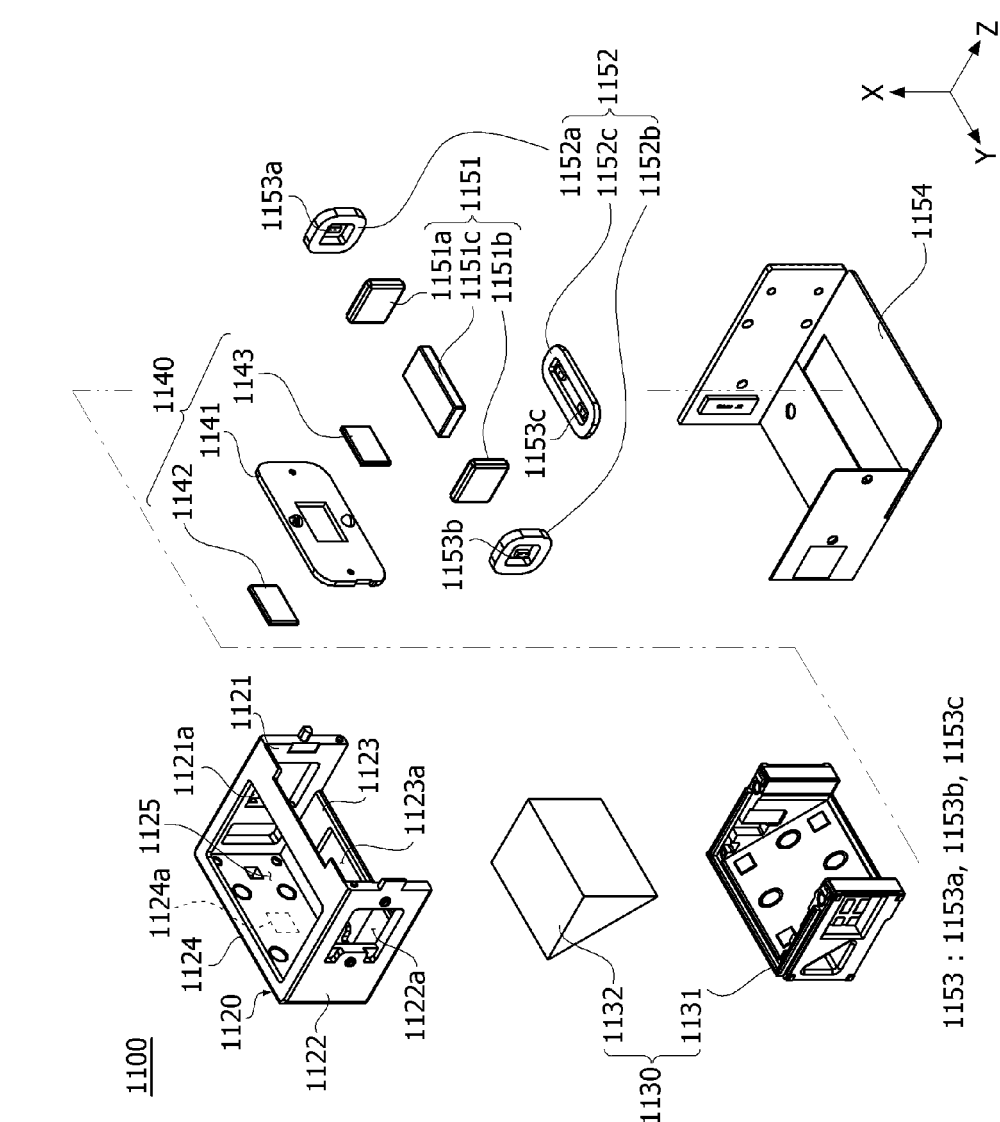
FIG. 4 is an exploded perspective view of a first camera actuator according to the embodiment.

FIG. 4 is an exploded perspective view of a first camera actuator according to the embodiment.

Referring to FIG. 4, the first camera actuator 1100 according to the embodiment includes a first shield can (not illustrated), a first housing 1120, a mover 1130, a rotating unit 1140, and a first driving unit 1150.

The mover 1130 may include a holder 1131 and an optical member 1132 seated on the holder 1131. In addition, the rotating unit 1140 includes a rotating plate 1141, a first magnet 1142 having a coupling strength with the rotating plate 1141, and a second magnet 1143 positioned in the rotating plate 1141. In addition, the first driving unit 1150 includes a first driving magnet 1151, a first driving coil 1152, a first Hall sensor unit 1153, and a first board unit 1154.

The first shield can (not illustrated) may be positioned at an outermost side of the first camera actuator 1100 to surround the rotating unit 1140 and the first driving unit 1150, which will be described below.

The first shield can (not illustrated) can block or reduce electromagnetic waves generated from the outside. Therefore, it is possible to reduce the occurrence of malfunction in the rotating unit 1140 or the first driving unit 1150.

The first housing 1120 may be positioned inside the first shield can (not illustrated). In addition, the first housing 1120 may be positioned inside a first board unit 1154 to be described below. The first housing 1120 may be fastened by being fitted into or matched with the first shield can (not illustrated).

The first housing 1120 may be formed of a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a lower side portion of the first housing 1120 and may include a lower surface.

In addition, the first housing side portion 1121 may include a first housing hole 1121a. A first coil 1152a to be described below may be positioned in the first housing hole 1121a.

In addition, the second housing side portion 1122 may include a second housing hole 1122a. In addition, a second coil 1152b to be described below may be positioned in the second housing hole 1122a.

The first coil 1152a and the second coil 1152b may be coupled to the first board unit 1154. In the embodiment, the first coil 1152a and the second coil 1152b may be electrically connected to the first board unit 1154 so that a current may flow therebetween. The current is an element of an electromagnetic force capable of tilting the first camera actuator with respect to an X-axis.

In addition, the third housing side portion 1123 may include a third housing hole 1123a. A third coil 1152c to be described below may be positioned in the third housing hole 1123a. The third coil 1152c may be coupled to the first board unit 1154. In addition, the third coil 1152c may be electrically connected to the first board unit 1154 so that a current may flow therebetween. The current is an element of an electromagnetic force capable of tilting the first camera actuator with respect to a Y-axis.

The fourth housing side portion 1124 may include a first housing groove 1124a. The first magnet 1142 to be described below may be disposed in an area facing the first housing groove 1124a. Therefore, the first housing 1120 may be coupled to the rotating plate 1141 by a magnetic force or the like.

In addition, the first housing groove 1124a according to the embodiment may be positioned on an inner surface or an outer surface of the fourth housing side portion 1124. Therefore, the first magnet 1142 may also be disposed to correspond to a position of the first housing groove 1124a.

In addition, the first housing 1120 may include an accommodating part 1125 formed by the first to fourth housing side portions 1121 to 1224. The mover 1130 may be positioned in the accommodating part 1125.

The mover 1130 may include the holder 1131 and the optical member 1132 seated on the holder 1131.

The holder 1131 may be seated in the accommodating part 1125 of the first housing 1120. The holder 1131 may include a first prism outer surface to a fourth prism outer surface respectively corresponding to the first housing side portion 1121, the second housing side portion 1122, the third housing side portion 1123, and the fourth housing side portion 1124.

A seating groove in which the second magnet 1143 may be seated may be disposed in the fourth prism outer surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. For example, the optical member 1132 may include a prism or mirror. However, the present invention is not limited thereto. In addition, the optical member 1132 may reflect light reflected from the outside (e.g., an object) into the camera device. In other words, the optical member 1132 can resolve spatial limits of the first camera actuator and the second camera actuator by changing the path of the reflected light. Therefore, it should be understood that the camera device may provide a high range of magnification by extending the optical path while a thickness thereof is minimized.

The rotating unit 1140 includes the rotating plate 1141, the first magnet 1142 having the coupling strength with the rotating plate 1141, and the second magnet 1143 positioned in the rotating plate 1141.

The rotating plate 1141 may be coupled to the mover 1130 and the first housing 1120. The rotating plate 1141 may include an additional magnet (not illustrated) positioned therein.

In addition, the rotating plate 1141 may be disposed adjacent to the optical axis. Therefore, the actuator according to the embodiment may easily change the optical path according to first-axis tilting and second-axis tilting to be described below.

The rotating plate 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. Detailed description thereof will be made below.

In addition, the first magnet 1142 includes a plurality of yokes, and the plurality of yokes may be positioned to face each other based on the rotating plate 1141. In the embodiment, the first magnet 1142 may include a plurality of facing yokes. In addition, the rotating plate 1141 may be positioned between the plurality of yokes.

As described above, the first magnet 1142 may be positioned in the first housing 1120. In addition, as described above, the first magnet 1142 may be seated on the inner surface or outer surface of the fourth housing side portion 1124. For example, the first magnet 1142 may be seated in a groove formed in the outer surface of the fourth housing side portion 1124. Alternatively, the first magnet 1142 may be seated in the first housing groove 1124a.

In addition, the second magnet 1143 may be positioned on the mover 1130, particularly, an outer surface of the holder 1131. With this configuration, the rotating plate 1141 may be easily coupled to the first housing 1120 and the mover 1130 by the coupling strength generated by a magnetic force between the second magnet 1143 and the first magnet 1142 disposed therein. In the present invention, the positions of the first magnet 1142 and the second magnet 1143 may be interchanged. An attractive force or repulsive force may be provided between the first magnet 1142 and the second magnet 1143 for coupling of the housing 1120 and the mover 1130.

The first driving unit 1150 includes the first driving magnet 1151, the first driving coil 1152, the first Hall sensor unit 1153, and the first board unit 1154.

The first driving magnet 1151 may include a plurality of magnets. In the embodiment, the first driving magnet 1151 may include a first magnet 1151*a*, a second magnet 1151*b*, and a third magnet 1151*c*.

The first magnet 1151*a*, the second magnet 1151*b*, and the third magnet 1151*c* may each be positioned on the outer surface of the holder 1131. In addition, the first magnet 1151*a* and the second magnet 1151*b* may be positioned to face each other. In addition, the third magnet 1151*c* may be positioned on a lower surface of the outer surface of the holder 1131. Detailed description thereof will be made below.

The first driving coil 1152 may include a plurality of coils. In the embodiment, the first driving coil 1152 may include a first coil 1152*a*, a second coil 1152*b*, and a third coil 1152*c*.

The first coil 1152*a* may be positioned to face the first magnet 1151*a*. Therefore, as described above, the first coil 1152*a* may be positioned in the first housing hole 1121*a* of the first housing side portion 1121.

In addition, the second coil 1152*b* may be positioned to face the second magnet 1151*b*. Therefore, as described above, the second coil 1152*b* may be positioned in the second housing hole 1122*a* of the second housing side portion 1122.

The first coil 1152*a* may be positioned to face the second coil 1152*b*. In other words, the first coil 1152*a* may be symmetrically disposed with the second coil 1152*b* with respect to the first direction (X-axis direction). This may also be applied to the first magnet 1151*a* and the second magnet 1151*b* in the same manner. In other words, the first magnet 1151*a* and the second magnet 1151*b* may be symmetrically disposed with respect to the first direction (X-axis direction). In addition, at least portions of the first coil 1152*a*, the second coil 1152*b*, the first magnet 1151*a*, and the second magnet 1151*b* may be disposed to overlap in the second direction (Y-axis direction). With this configuration, the X-axis tilting may be accurately performed without being biased to one side by the electromagnetic force between the first coil 1152*a* and the first magnet 1151*a* and the electromagnetic force between the second coil 1152*b* and the second magnet 1151*b*.

The third coil 1152*c* may be positioned to face the third magnet 1151*c*. Therefore, as described above, the third coil 1152*c* may be positioned in the third housing hole 1123*a* of the third housing side portion 1123. The third coil 1152*c* may generate an electromagnetic force with the third magnet 1151*c* so that the mover 1130 and the rotating unit 1140 may perform a Y-axis tilting based on the first housing 1120.

Here, an X-axis tilting is a tilting with respect to the X-axis, and a Y-axis tilting is a tilting with respect to the Y-axis.

The first Hall sensor unit 1153 may include a plurality of Hall sensors. The Hall sensor corresponds to and is used interchangeably with "sensor unit" to be described below. In the embodiment, the first Hall sensor unit 1153 may include a first Hall sensor 1153*a*, a second Hall sensor 1153*b*, and a third Hall sensor 1153*c*.

The first Hall sensor 1153*a* may be positioned inside the first coil 1152*a*. In addition, the second Hall sensor 1153*b* may be disposed symmetrically with the first Hall sensor 1153*a* in the first direction (X-axis direction) and the third direction (Z-axis direction). In addition, the second Hall sensor 1153*b* may be positioned inside the second coil 1152*b*.

The first Hall sensor 1153*a* may detect a change in a magnetic flux inside the first coil 1152*a*. In addition, the second Hall sensor 1153*b* may detect a change in a magnetic flux in the second coil 1152*b*. Therefore, it is possible to perform position sensing between the first and second magnets 1151*a* and 1151*b* and the first and second Hall sensors 1153*a* and 1153*b*. The first camera actuator according to the embodiment may more accurately control the X-axis tilting by detecting the position through, for example, the first and second Hall sensors 1153*a* and 1153*b*.

In addition, the third Hall sensor 1153*c* may be positioned inside the third coil 1152*c*. The third Hall sensor 1153*c* may detect a change in a magnetic flux inside the third coil 1152*c*. Therefore, it is possible to perform position sensing between the third magnet 1151*c* and the third Hall sensor 1153*bc*. Therefore, the first camera actuator according to the embodiment may control the Y-axis tilting. At least one of the first to third Hall sensors may be provided.

The first board unit 1154 may be positioned under the first driving unit 1150. The first board unit 1154 may be electrically connected to the first driving coil 1152 and the first Hall sensor unit 1153. For example, the first board unit 1154 may be coupled to the first driving coil 1152 and the first Hall sensor unit 1153 by a surface mount technology (SMT). However, the present invention is not limited to this method.

The first board unit 1154 may be positioned between the first shield can (not illustrated) and the first housing 1120 and coupled to the first shield can and the first housing 1120. The coupling method may be variously performed as described above. In addition, through the coupling, the first driving coil 1152 and the first Hall sensor unit 1153 may be positioned on an outer surface of the first housing 1120.

The first board unit 1154 may include a circuit board having wiring patterns that may be electrically connected, such as a rigid printed circuit board (rigid PCB), a flexible PCB, and a rigid-flexible PCB. However, the present invention is not limited to these types.

Figure 5:
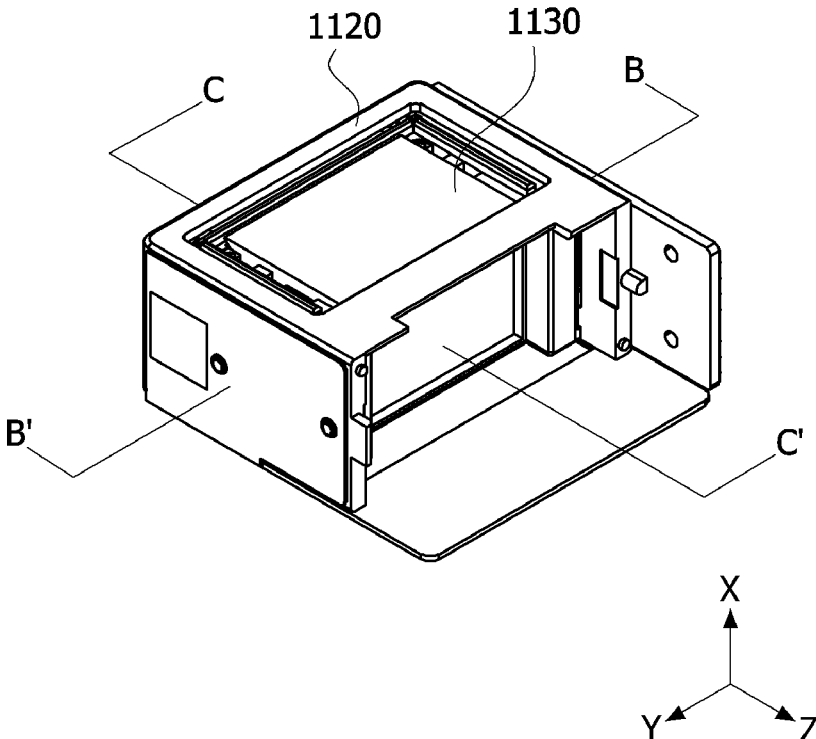
FIG. 5 is a perspective view of the first camera actuator according to the embodiment from which a first shield can and a board are removed.
Figure 6:
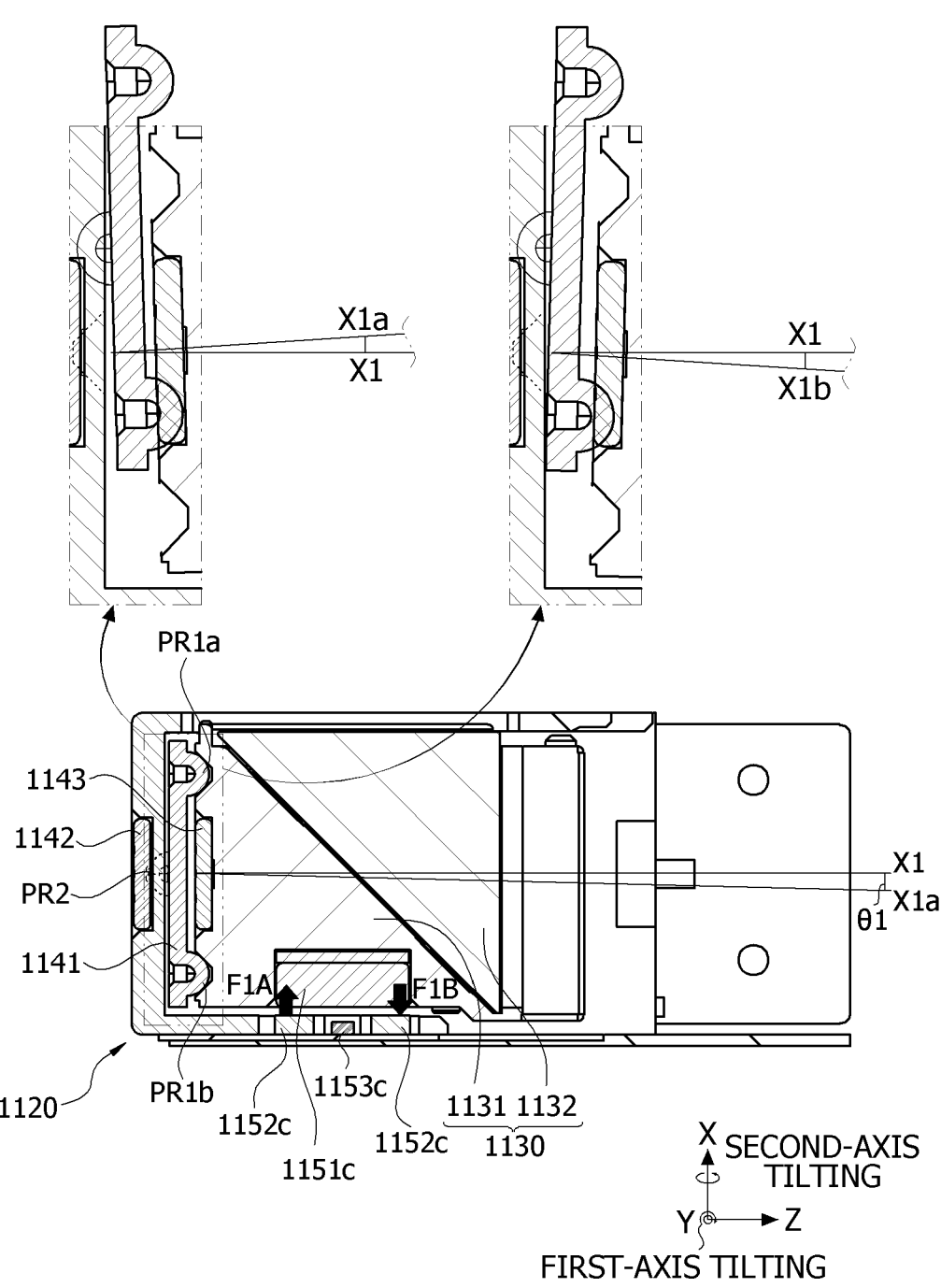
FIG. 6 is a cross-sectional view along line B-B' in FIG. 5.
Figure 7:
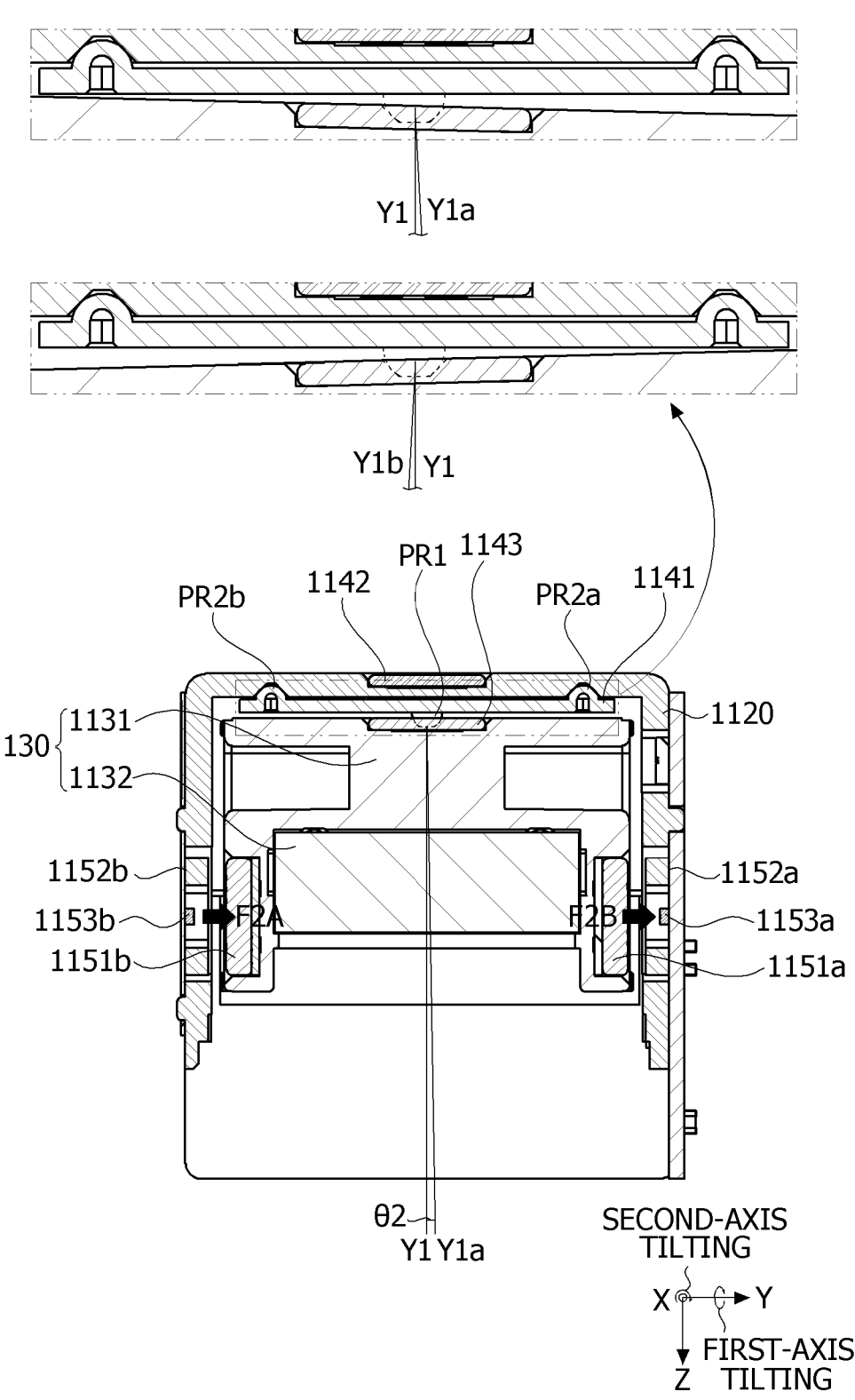
FIG. 7 is a cross-sectional view along line C-C' in FIG. 5.

FIG. 5 is a perspective view of the first camera actuator according to the embodiment from which a first shield can and a board are removed, FIG. 6 is a cross-sectional view along line B-B' in FIG. 5, and FIG. 7 is a cross-sectional view along line C-C' in FIG. 5.

Referring to FIGS. 5 to 7, the first coil 1152*a* may be positioned on the first housing side portion 1121.

In addition, the first coil 1152*a* and the first magnet 1151*a* may be positioned to face each other. At least a portion of the first magnet 1151*a* may overlap the first coil 1152*a* in the second direction (Y-axis direction).

In addition, the second coil 1152*b* may be positioned on the second housing side portion 1122. Therefore, the second coil 1152*b* and the second magnet 1151*b* may be positioned to face each other. At least a portion of the second magnet 1151*b* may overlap the second coil 1152*b* in the second direction (Y-axis direction).

In addition, the first coil 1151*a* and the second coil 1152*b* may overlap each other in the second direction (Y-axis direction). In addition, the first magnet 1151*a* and the second magnet 1151*b* may overlap each other in the second direction (Y-axis direction). With this configuration, the electromagnetic force applied to the outer surfaces of the holder (the first holder outer surface and the second holder outer surface) may be positioned on parallel axes in the second direction (Y-axis direction) so that the X-axis tilting may be performed accurately and precisely.

In addition, a first accommodating groove (not illustrated) may be positioned at the fourth holder outer surface. In addition, first protrusions PR1*a* and PR1*b* may be disposed in the first accommodating groove. Therefore, when the X-axis tilting is performed, the first protrusions PR1*a* and PR1*b* may serve as reference axes (or rotation axes) of the tilting. Therefore, the rotating plate 1141 and the mover 1130 may move to a left or right side.

As described above, the second protruding portion PR2 may be seated in a groove of an inner surface of the fourth housing side portion 1124. In addition, when the Y-axis tilting is performed, the rotating plate and the mover may be rotated using the second protruding portion PR2 as a reference axis of the Y-axis tilting.

According to the embodiment, an OIS may be performed by the first protruding portion and the second protruding portion.

Referring to FIG. 6, the Y-axis tilting may be performed. In other words, an OIS can be implemented by rotating the first camera actuator in the first direction (X-axis direction).

In the embodiment, the third magnet 1151*c* disposed under the holder 1131 may generate the electromagnetic force with the third coil 1152*c* to tilt or rotate the mover 1130 in the first direction (X-axis direction).

Specifically, the rotating plate 1141 may be coupled to the first housing 1120 and the mover 1130 by the first magnet 1142 in the first housing 1120 and the second magnet 1143 in the mover 1130. In addition, the first protruding portions PR1 may be spaced apart from each other in the first direction (X-axis direction) and supported by the first housing 1120.

In addition, the rotating plate 1141 may be rotated or tilted using the second protruding portion PR2 protruding toward the mover 1130 as a reference axis (or a rotation axis). In other words, the rotating plate 1141 may perform the Y-axis tilting using the second protruding portion PR2 as the reference axis.

For example, an OIS can be implemented by rotating (X1→X1*a* or X1*b*) the mover 130 at a first angle θ1 in the X-axis direction by first electromagnetic forces F1A and F1B between the third magnet 1151*c* disposed in a third seating groove and the third coil 1152*c* disposed on a third board side portion. The first angle θ1 may be in a range of ±1° to ±3°. However, the present invention is not limited thereto. Hereinafter, in the first camera actuators according to various embodiments, the electromagnetic force may move the mover by generating a force in the described direction or move the mover in the described direction even when a force is generated in another direction. In other words, the described direction of the electromagnetic force is a direction of the force generated by the magnet and the coil to move the mover.

Referring to FIG. 7, the X-axis tilting may be performed. In other words, an OIS can be implemented by rotating the mover 1130 in the second direction (Y-axis direction).

The OIS can be implemented by tilting or rotating (or X-axis tilting) the mover 1130 in the Y-axis direction.

In the embodiment, the first magnet 1151*a* and the second magnet 1151*b* disposed in the holder 1131 may tilt or rotate the rotating plate 1141 and the mover 1130 in the second direction (Y-axis direction) by generating the electromagnetic force with the first coil 1152*a* and the second coil 1152*b*, respectively.

The rotating plate 1141 may be rotated or tilted (X-axis tilting) in the second direction using the first protruding portion PR1 as a reference axis (or a rotation axis).

For example, an OIS can be implemented by rotating (Y1→Y1*a*, Y1*b*) the mover 130 at a second angle θ2 in the Y-axis direction by second electromagnetic forces F2A and F2B between the first and second magnets 1151*a* and 1151*b* disposed in a first seating groove and the first and second coils 1152*a* and 1152*b* disposed on first and second board side portions. The second angle θ2 may be in a range of ±1° to ±3°. However, the present invention is not limited thereto. Here, the electromagnetic forces F2A and F2B may mean directions in which the mover 1130 moves by the electromagnetic forces generated between the first and second magnets and the first and second coils. In practice, the electromagnetic forces generated between the first and second magnets and the first and second coils may be partially generated in a direction opposite to the third direction (Z-axis direction) in a right region of the drawing and may be generated in the third direction (Z-axis direction) in a left region thereof. Therefore, the mover may move or rotate along the illustrated electromagnetic forces F2A and F2B.

In addition, as described above, the electromagnetic forces generated by the first and second magnets 1151*a* and 1151*b* and the first and second coils 1152*a* and 1152*b* may act in the third direction or a direction opposite to the third direction. For example, the electromagnetic force may be generated on a left side portion of the mover 1130 in the third direction (Z-axis direction) and may act on a right side portion of the mover 1130 in a direction opposite to the third direction (Z-axis direction). Therefore, the mover 1130 may rotate with respect to the first direction. Alternatively, the mover 130 may be moved in the second direction.

As described above, the first camera actuator according to the embodiment may control the rotating plate 1141 and the mover 1130 to be rotated in the first direction (X-axis direction) or the second direction (Y-axis direction) by the electromagnetic force between the first driving magnet in the holder and the first driving coil disposed in the housing, thereby minimizing the occurrence of a decentering or tilting phenomenon and providing the best optical characteristics upon implementing the OIS. In addition, as described above, "Y-axis tilting" may correspond to rotating or tilting in the first direction (X-axis direction). In addition, "X-axis tilting" may correspond to rotating or tilting in the second direction (Y-axis direction).

Figure 8:
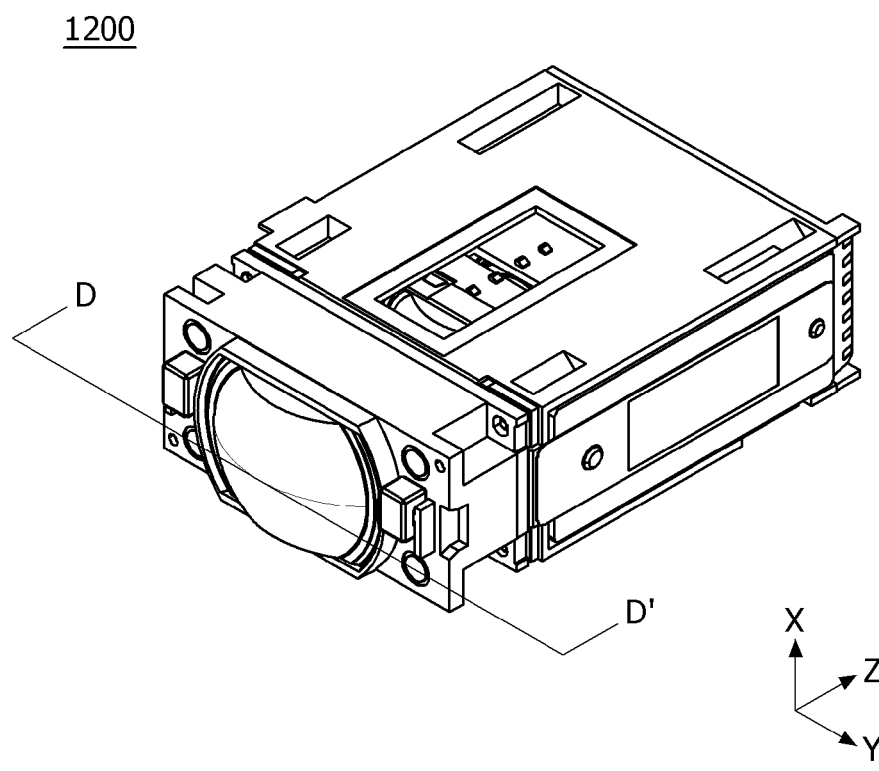
FIG. 8 is a perspective view of a second camera actuator according to the embodiment.
Figure 9:
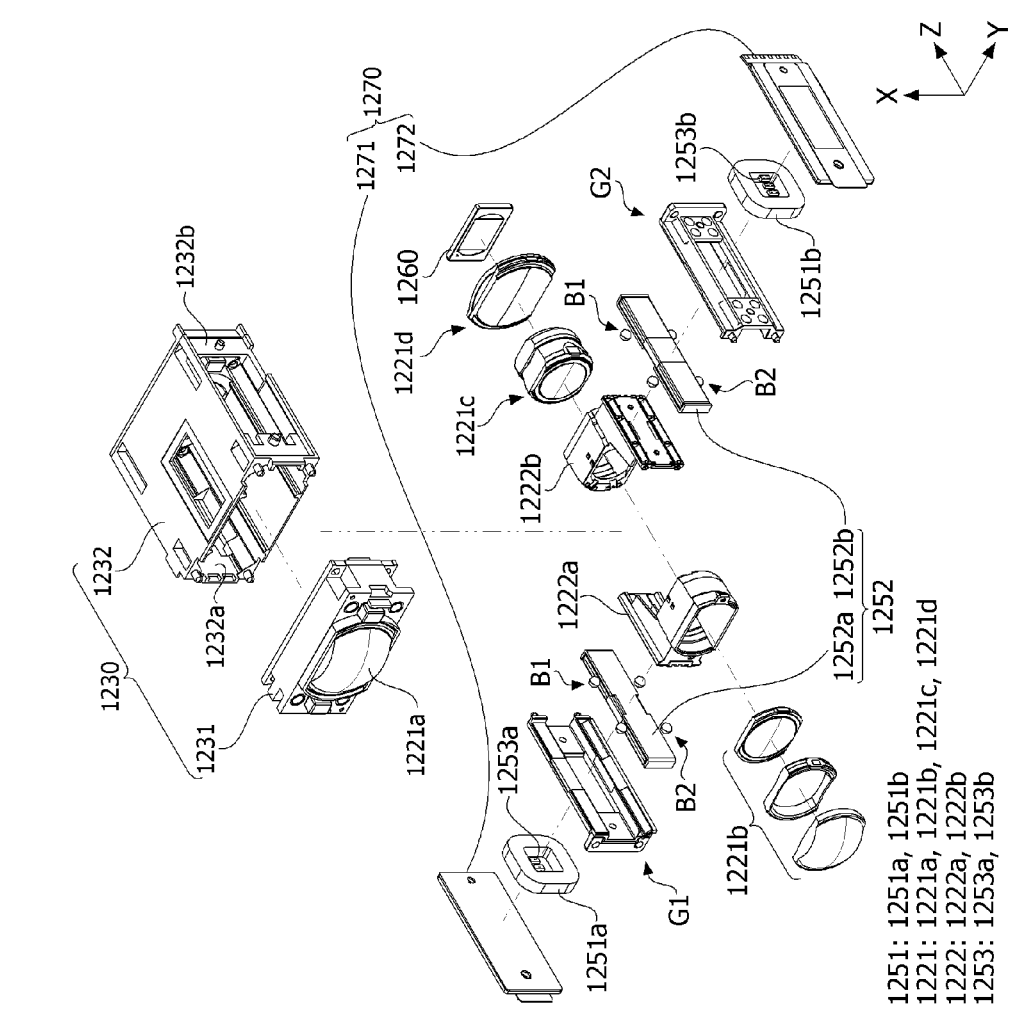
FIG. 9 is an exploded perspective view of the second camera actuator according to the embodiment.
Figure 10:
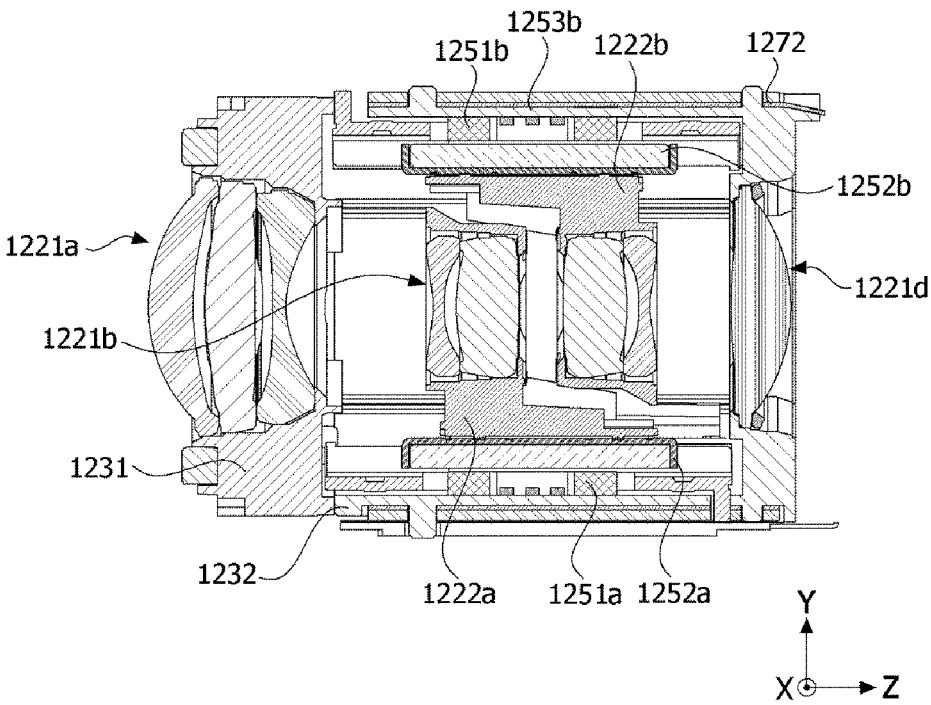
FIG. 10 is a cross-sectional view along line D-D' in FIG. 8.
Figure 11:
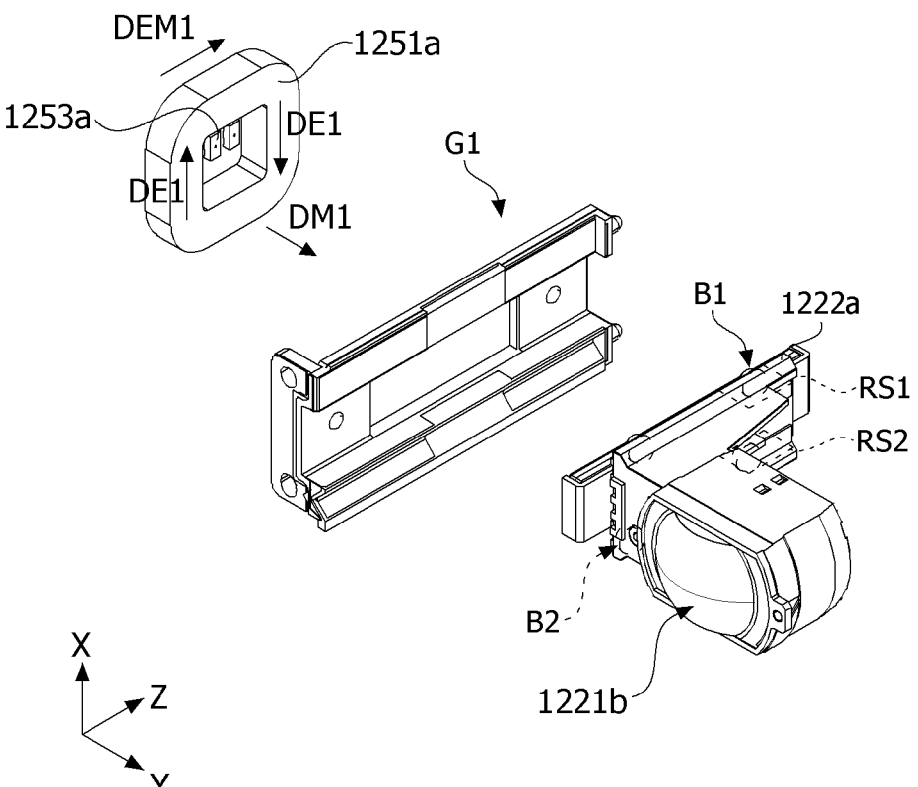
FIGS. 11 and 12 are views for describing each driving operation of a lens assembly according to the embodiment.
Figure 12:
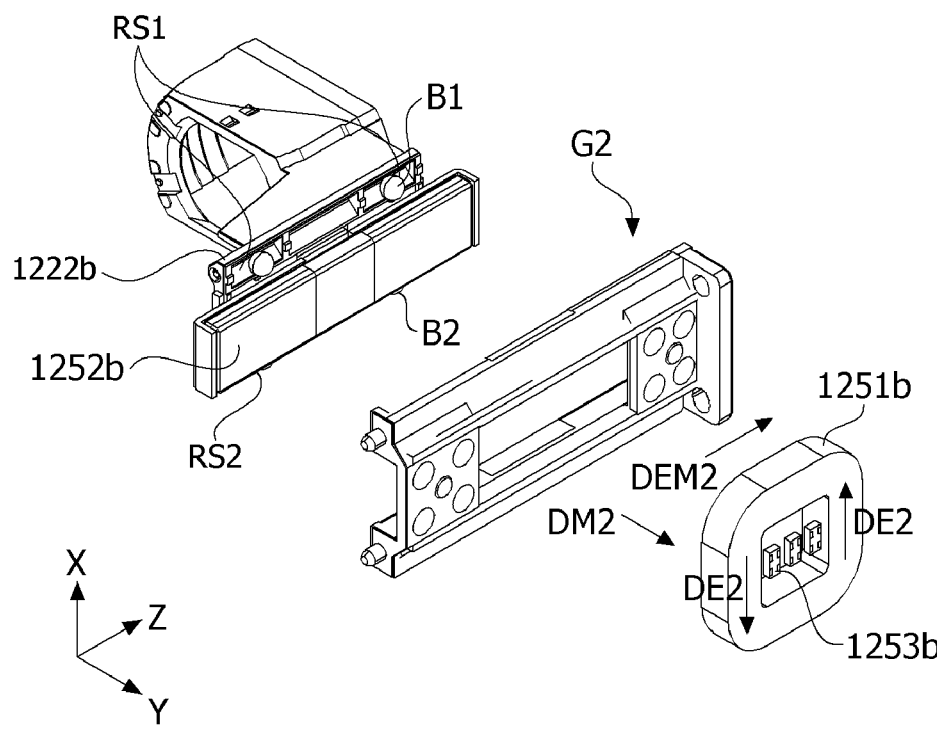
Figure 13:
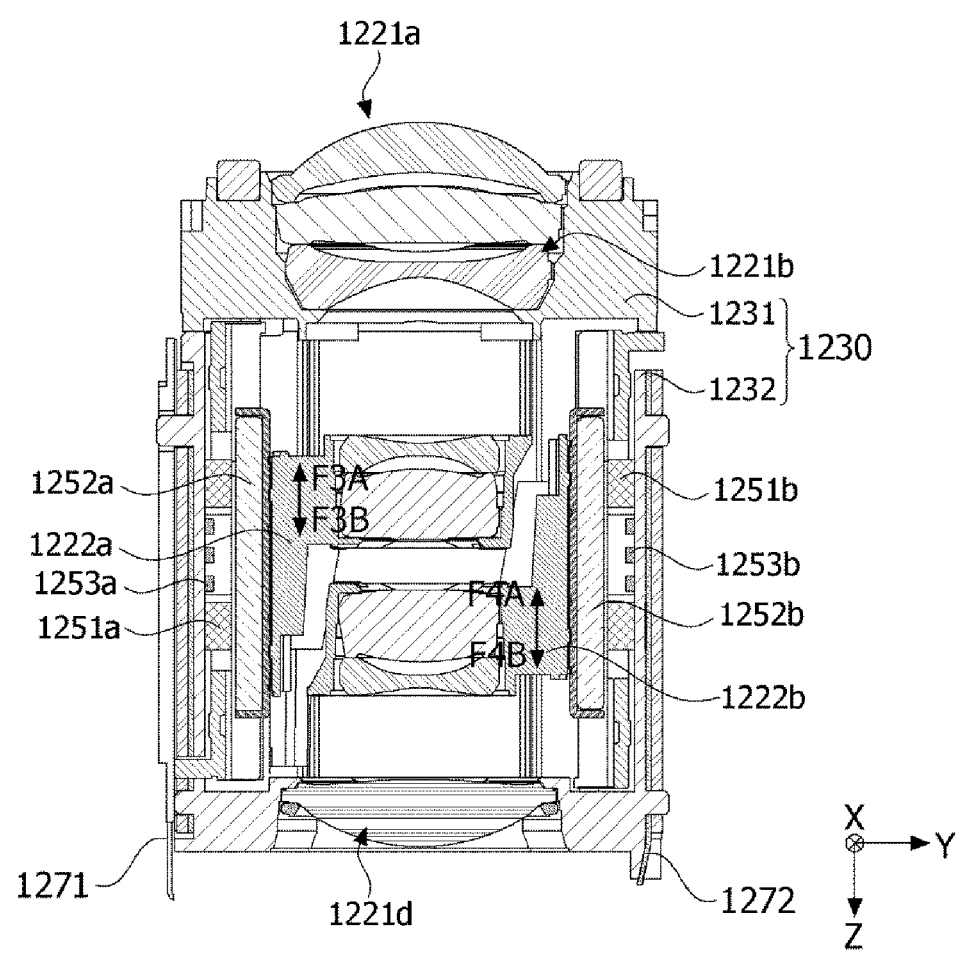
FIG. 13 is a view for describing a driving operation of the second camera actuator according to the embodiment.

FIG. 8 is a perspective view illustrating a second camera actuator according to the embodiment, FIG. 9 is an exploded perspective view illustrating the second camera actuator according to the embodiment, FIG. 10 is a cross-sectional view of the second camera actuator along line D-D' in FIG. 8, FIGS. 11 and 12 are views for describing each driving operation of a lens assembly according to the embodiment, and FIG. 13 is a view for describing driving of the second camera actuator according to the embodiment.

Referring to FIGS. 8 to 10, the second camera actuator 1200 according to the embodiment may include a lens unit 1220, a second housing 1230, a second driving unit 1250, a base unit 1260, a second board unit 1270, and a bonding member 1280. Furthermore, the second camera actuator 1200 may further include a second shield can (not illustrated), an elastic unit (not illustrated), and a bonding member (not illustrated).

The second shield can (not illustrated) may be positioned in one area (e.g., an outermost side) of the second camera actuator 1200 and positioned to surround the components (the lens unit 1220, the second housing 1230, the second driving unit 1250, the base unit 1260, the second board unit 1270, and an image sensor IS) to be describe below.

The second shield can (not illustrated) can block or reduce electromagnetic waves generated from the outside. Therefore, it is possible to reduce the occurrence of malfunction in the second driving unit 1250.

The lens unit 1220 may be positioned in the second shield can (not illustrated). The lens unit 1220 may move in the third direction (Z-axis direction or optical axis direction). Therefore, the above-described AF function and zooming function can be performed.

In addition, the lens unit 1220 may be positioned in the second housing 1230. Therefore, at least a portion of the lens unit 1220 may move in the second housing 1230 in the optical axis direction or the third direction (Z-axis direction).

Specifically, the lens unit 1220 may include a lens group 1221 and a moving assembly 1222.

First, the lens group 1221 may include at least one lens. In addition, although a plurality of lens groups 1221 may be provided, the following description will be made based on one lens group.

The lens group 1221 may be coupled to the moving assembly 1222 and moved by an electromagnetic force generated from a fourth magnet 1252a and a fifth magnet 1252b coupled to the moving assembly 1222 in the third direction (Z-axis direction).

In the embodiment, the lens group 1221 may include a first lens group 1221a, a second lens group 1221b, and a third lens group 1221c. The first lens group 1221a, the second lens group 1221b, and the third lens group 1221c may be sequentially disposed in the optical axis direction. Furthermore, the lens group 1221 may further include a fourth lens group 1221d. The fourth lens group 1221d may be disposed at a rear end of the third lens group 1221c.

The first lens group 1221a may be fixedly coupled to a 2-1 housing. In other words, the first lens group 1221a may not move in the optical axis direction.

The second lens group 1221b may be coupled to a first lens assembly 1222a to move in the third direction or the optical axis direction. Magnification adjustment may be performed by moving the first lens assembly 1222a and the second lens group 1221b.

The third lens group 1221c may be coupled to the second lens assembly 1222b to move in the third direction or the optical axis direction. Focus adjustment or auto focusing may be performed by moving the third lens group 1221.

However, the present invention is not limited to the number of lens groups, and the fourth lens group 1221d may not be present, or additional lens groups or the like other than the fourth lens group 1121d may be further disposed.

The moving assembly 1222 may include an opening area surrounding the lens group 1221. The moving assembly 1222 is used interchangeably with the lens assembly. In addition, the moving assembly 1222 may be coupled to the lens group 1221 by various methods. In addition, the moving assembly 1222 may include a groove in a side surface thereof and may be coupled to the fourth magnet 1252a and the fifth magnet 1252b through the groove. A coupling member or the like may be applied to the groove.

In addition, the moving assembly 1222 may be coupled to the elastic units (not illustrated) at an upper end and a rear end thereof. Therefore, the moving assembly 1222 may be supported by the elastic units (not illustrated) while moving in the third direction (Z-axis direction). In other words, the position of the moving assembly 1222 may be maintained in the third direction (Z-axis direction). The elastic unit (not illustrated) may be formed of various elastic elements such as a leaf spring.

The moving assembly 1222 may be positioned in the second housing 1230 and may include the first lens assembly 1222a and a second lens assembly 1222b.

An area of the second lens assembly 1222b in which the third lens group is seated may be positioned at a rear end of the first lens assembly 1222a. In other words, the area of the second lens assembly 1222b in which the third lens group 1221c is seated may be positioned between an area of the first lens assembly 1222a in which the second lens group 1221b is seated and the image sensor.

The first lens assembly 1222a and the second lens assembly 1222b may face a first guide unit G1 and a second guide unit G2, respectively. The first guide unit G1 and the second guide unit G2 may be positioned on a first side portion and a second side portion of the second housing 1230 to be described below. Detailed description thereof will be made below.

In addition, second driving magnets may be seated on outer surfaces of the first lens assembly 1222a and the second lens assembly 1222b. For example, the fifth magnet 1252b may be seated on the outer surface of the second lens assembly 1222b. The fourth magnet 1252a may be seated on the outer surface of the first lens assembly 1222a.

The second housing 1230 may be disposed between the lens unit 1220 and the second shield can (not illustrated). In addition, the second housing 1230 may be disposed to surround the lens unit 1220.

The second housing 1230 may include a 2-1 housing 1231 and a 2-2 housing 1232.

The 2-1 housing 1231 may be coupled to the first lens group 1221a and may also be coupled to the above-described first camera actuator. The 2-1 housing 1231 may be positioned in front of the 2-2 housing 1232.

In addition, the 2-2 housing 1232 may be positioned at a rear end of the 2-1 housing 1231. The lens unit 1220 may be seated inside the 2-2 housing 1232.

A hole may be formed in a side portion of the second housing 1230 (or the 2-2 housing 1232). A fourth coil 1251a and a fifth coil 1251b may be disposed in the hole. The hole may be positioned to correspond to the above-described groove of the moving assembly 1222.

In the embodiment, the second housing 1230 (in particular, the 2-2 housing 1232) may include a first side portion 1232a and a second side portion 1232b. The first side portion 1232a and the second side portion 1232b may be positioned to correspond to each other. For example, the first side portion 1232a and the second side portion 1232b may be symmetrically disposed with respect to the third direction. A second driving coil 1251 may be positioned on the first side portion 1232a and the second side portion 1232b. In addition, the second board unit 1270 may be seated on outer surfaces of the first side portion 1232a and the second side portion 1232b. In other words, a first board 1271 may be positioned on the outer surface of the first side portion 1232a, and a second board 1272 may be positioned on the outer surface of the second side portion 1232b.

Furthermore, the first guide unit G1 and the second guide unit G2 may be positioned on the first side portion 1232a and the second side portion 1232b of the second housing 1232 (in particular, the 2-2 housing 1232).

The first guide unit G1 and the second guide unit G2 may be positioned to correspond to each other. For example, the first guide unit G1 and the second guide unit G2 may be positioned to face each other with respect to the third direction (Z-axis direction). In addition, at least portions of the first guide unit G1 and the second guide unit G2 may overlap each other in the second direction (Y-axis direction).

The first guide unit G1 and the second guide unit G2 may include at least one groove (e.g., a guide groove) or recess. In addition, a first ball B1 or a second ball B2 may be seated in the groove or the recess. Therefore, the first ball B1 or the second ball B2 may move in the guide groove of the first guide unit G1 or the guide groove of the second guide unit G2 in the third direction (Z-axis direction).

Alternatively, the first ball B1 or the second ball B2 may move in the third direction along a rail formed at an inner side of the first side portion 1232a of the second housing 1230 or a rail formed at an inner side of the second side portion 1232b of the second housing 1230.

Therefore, the first lens assembly 1222a and the second lens assembly 1222b may move in the third direction.

According to the embodiment, the first ball B1 may be disposed on an upper side portion of the first lens assembly 1222a or the second lens assembly 1222b. In addition, the second ball B2 may be disposed on a lower side portion of the first lens assembly 1222a or the second lens assembly 1222b. For example, the first ball B1 may be positioned above the second ball B2. Therefore, at least a portion of the first ball B1 may overlap the second ball B2 in the first direction (X-axis direction) depending on a position.

In addition, the first guide unit G1 and the second guide unit G2 may include first guide grooves GG1a and GG2a facing a first recess RS1. In addition, the first guide unit G1 and the second guide unit G2 may include second guide grooves GG1b and GG2b facing a second recess RS2. The first guide grooves GG1a and GG2a and the second guide grooves GG1b and GG2b may be grooves extending in the third direction (Z-axis direction). In addition, the first guide grooves GG1a and GG2a and the second guide grooves GG1b and GG2b may be grooves with different shapes. For example, the first guide grooves GG1a and GG2a may be grooves having inclined side surfaces, and the second guide grooves GG1b and GG2b may be grooves having side surfaces perpendicular to lower surfaces thereof. The above-described first and second guide grooves may have various shapes. With this configuration, it is possible to improve the ease of assembly.

The fifth magnet 1252b may be positioned to face the fifth coil 1251b. In addition, the fourth magnet 1252a may be positioned to face the fourth coil 1251a.

The elastic unit (not illustrated) may include a first elastic member (not illustrated) and a second elastic member (not illustrated). The first elastic member (not illustrated) may be coupled to an upper surface of the moving assembly 1222. The second elastic member (not illustrated) may be coupled to a lower surface of the moving assembly 1222. In addition, the first elastic member (not illustrated) and the second elastic member (not illustrated) may be formed of a leaf spring as described above. In addition, the first elastic member (not illustrated) and the second elastic member (not illustrated) may provide elasticity for moving the moving assembly 1222. However, the present invention is not limited to the above-described position, and the elastic unit may be disposed at any of various positions.

In addition, the second driving unit 1250 may provide a driving force for moving the lens unit 1220 in the third direction (Z-axis direction). The second driving unit 1250 may include the second driving coil 1251 and the second driving magnet 1252. Furthermore, the second driving unit 1250 may further include a second Hall sensor unit. The second Hall sensor unit 1253 may include at least one fourth Hall sensor 1253a and may be positioned inside or outside the second driving coil 1251.

The moving assembly may be moved in the third direction (Z-axis direction) by the electromagnetic force generated between the second driving coil 1251 and the second driving magnet 1252.

The second driving coil 1251 may include the fourth coil 1251a and the fifth coil 1251b. The fourth coil 1251a and the fifth coil 1251b may be disposed in the holes formed in the side portions of the second housing 1230. In addition, the fourth coil 1251a and the fifth coil 1251b may be electrically connected to the second board unit 1270. Therefore, the fourth coil 1251a and the fifth coil 1251b may receive a current or the like through the second board unit 1270.

In addition, the second driving coil 1251 may be coupled to the second board unit 1270 through a yoke or the like. Furthermore, in an embodiment, the second driving coil 1251 is a fixed element together with the second board unit 1270. In contrast, the second driving magnet 1252 is a moving element that moves in the optical axis direction (Z-axis direction) together with the first and second assemblies.

The second driving magnet 1252 may include the fourth magnet 1252a and the fifth magnet 1252b. The fourth magnet 1252a and the fifth magnet 1252b may be disposed in the above-described groove of the moving assembly 1222 and positioned to correspond to the fourth coil 1251a and the fifth coil 1251b. In addition, the second driving magnet 1252 may be coupled to the first and second lens assemblies (or the moving assembly) together with a yoke to be described below.

The base unit 1260 may be positioned between the lens unit 1220 and the image sensor IS. A component such as a filter may be fixed to the base unit 1260. In addition, the base unit 1260 may be disposed to surround the above-described image sensor. With this configuration, since the image sensor is free from foreign substances and the like, it is possible to improve the reliability of the device. However, the following description will be made without this in some drawings.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

In addition, the second camera actuator may be a fixed zoom or a continuous zoom. For example, the second camera actuator may provide a movement of the lens group 1221.

In addition, the second camera actuator may be formed of a plurality of lens assemblies. For example, in addition to the first lens assembly 1222a and the second lens assembly 1222b, at least one of a third lens assembly (not illustrated) and the guide pin (not illustrated) may be disposed in the second camera actuator. The above-described contents may be applied thereto. Therefore, the second camera actuator may perform a high-magnification zooming function through the second driving unit. For example, the first lens assembly 1222a and the second lens assembly 1222b may be moving lenses that move through the second driving unit and the guide pin (not illustrated), and the third lens assembly (not illustrated) may be a fixed lens, but the present invention is not limited thereto. For example, the third lens assembly (not illustrated) may perform a function of a focator by which light forms an image at a specific position, and the first lens assembly may perform a function of a variator for re-forming an image formed by the third lens assembly (not illustrated), which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the second lens assembly 1222b which is the variator. However, the configuration of the embodiment will be described with reference to the following drawings.

The image sensor may be positioned at the inner side or the outer side of the second camera actuator. In an embodiment, as illustrated, the image sensor may be positioned at the outer side of the second camera actuator. For example, the image sensor may be positioned on a circuit board. The image sensor may receive light and convert the received light into an electrical signal. In addition, the image sensor may include a plurality of pixels in the form of an array. In addition, the image sensor may be positioned on the optical axis.

The second board unit 1270 may be in contact with the second housing side portion. For example, the second board unit 1270 may be positioned on an outer surface (first outer surface) of the first side portion and an outer surface (second outer surface) of the second side portion of the second housing, in particular, the 2-2 housing and may come into contact with the first outer surface and the second outer surface.

Referring to FIGS. 11 and 12, in the camera device according to the embodiment, the first lens assembly 1222a may move along a rail positioned on the inner surface of the housing through the first ball B1 in a direction parallel to the optical axis, that is, in the third direction (Z-axis direction) or a direction opposite to the third direction by an electromagnetic force DEM1 generated between the fourth magnet 1252a and the fourth coil 1251a.

Specifically, in the camera device according to the embodiment, the fourth magnet 1252a may be provided in the first lens assembly 1222a, for example, by a bipolar magnetization method. For example, in the embodiment, both an N pole and an S pole of the fourth magnet 1252a may be positioned to face the fourth coil 1251a. Therefore, each of the N pole and the S pole of the fourth magnet 1252a may be disposed to correspond to an area in which a current flows in the fourth coil 1251a in the X-axis direction or a direction opposite to the X-axis direction.

In the embodiment, when a magnetic force is applied from the N pole of the fourth magnet 1252a in a direction opposite to the second direction (Y-axis direction) and a current DE1 flows in the fourth coil 1251a corresponding to the N pole in a direction opposite to the first direction (X-axis direction), the electromagnetic force DEM1 may act in the third direction (Z-axis direction) according to the interaction of the electromagnetic force (e.g., Fleming's left hand rule).

In addition, in the embodiment, when a magnetic force is applied from the S pole of the fourth magnet 1252a in the second direction (Y-axis direction) and the current DE1 flows in the fourth coil 1251a corresponding to the S pole in the first direction (X-axis direction), the electromagnetic force DEM1 may act in the Z-axis direction according to the interaction of the electromagnetic force.

At this time, since the fourth coil 1251a is in a state of being fixed to the second housing side portion, the first lens assembly 1222a on which the fourth magnet 1252a is disposed may move in the direction opposite to the Z-axis direction by the electromagnetic force DEM1 according to the current direction. In other words, the second driving magnet may move in an opposite direction of the electromagnetic force applied to the second driving coil. In addition, the direction of the electromagnetic force may be changed depending on the current of the coil and the magnetic force of the magnet.

Therefore, the first lens assembly 1222a may move along the rail positioned on the inner surface of the housing through the first ball B1 in a direction (both directions) parallel to the third direction or the optical axis direction. At this time, the electromagnetic force DEM1 may be controlled in proportion to the current DE1 applied to the fourth coil 1251a.

The first lens assembly 1222a or the second lens assembly 1222b may include the first recess RS1 in which the first ball B1 is seated. In addition, the first lens assembly 1222a or the second lens assembly 1222b may include the second recess RS2 in which the second ball B2 is seated. A length of the first recess RS1 in the optical axis direction (Z-axis direction) may be preset. In addition, a length of the second recess RS2 in the optical axis direction (Z-axis direction) may be preset. Therefore, moving distances of the first ball B1 and the second ball B2 in the optical axis direction in each recess may be adjusted. In other words, the first recess RS1 or the second recess RS2 may be a stopper for the first and second balls B1 and B2.

In addition, in the camera device according to the embodiment, the fifth magnet 1252b may be provided on the second lens assembly 1222b by, for example, the bipolar magnetization method, or the like. For example, in the embodiment, both the N pole and the S pole of the fifth magnet 1252b may be positioned to face the fifth coil 1251b. Therefore, each of the N pole and the S pole of the fifth magnet 1252b may be disposed to correspond to an area in which a current flows in the fifth coil 1251b in the X-axis direction or a direction opposite to the X-axis direction.

In the embodiment, when a magnetic force DM2 is applied from the N pole of the fifth magnet 1252b in the second direction (Y-axis direction) and the current DE2 flows in the fifth coil 1251b corresponding to the N pole in the first direction (X-axis direction), an electromagnetic force DEM2 may act in the third direction (Z-axis direction) according to the interaction of the electromagnetic force (e.g., Fleming's left hand rule).

In addition, in the embodiment, when a magnetic force is applied from the S pole of the fifth magnet 1252b in a direction opposite to the second direction (Y-axis direction) and the current DE2 flows in the fifth coil 1251b corresponding to the S pole in a direction opposite to the first direction (X-axis direction), the electromagnetic force DEM2 may act in the Z-axis direction according to the interaction of the electromagnetic force.

At this time, since the fifth coil 1251b is in a state of being fixed to the second housing side portion, the second lens assembly 1222b on which the fifth magnet 1252b is disposed may be moved by the electromagnetic force DEM2 according to the current direction in a direction opposite to the Z-axis direction. For example, as described above, the direction of the electromagnetic force may be changed depending on the current of the coil and the magnetic force of the magnet. Therefore, the second lens assembly 1222b may move along the rail positioned on the inner surface of the second housing through the second ball B2 in a direction parallel to the third direction (Z-axis direction). At this time, the electromagnetic force DEM2 may be controlled in proportion to the current DE2 applied to the fifth coil 1251b.

Referring to FIG. 13, in the camera device according to the embodiment, the second driving unit may provide driving forces F3A, F3B, F4A, and F4B that move the first lens assembly 1222*a* and the second lens assembly 1222*b* of the lens unit 1220 in the third direction (Z-axis direction). As described above, the second driving unit may include the second driving coil 1251 and the second driving magnet 1252. In addition, the lens unit 1220 may be moved in the third direction (Z-axis direction) by the electromagnetic force generated between the second driving coil 1251 and the second driving magnet 1252.

At this time, the fourth coil 1251*a* and the fifth coil 1251*b* may be disposed in the holes formed in the side portions (e.g., the first side portion and the second side portion) of the second housing 1230. In addition, the fifth coil 1251*b* may be electrically connected to the first board 1271. The fourth coil 1251*a* may be electrically connected to the second board 1272. Therefore, the fourth coil 1251*a* and the fifth coil 1251*b* may receive a driving signal (e.g., a current) from a driving driver on the circuit board 1300 through the second board unit 1270.

At this time, the first lens assembly 1222*a* on which the fourth magnet 1252*a* is seated may be moved in the third direction (Z-axis direction) by the electromagnetic forces F3A and F3B between the fourth coil 1251*a* and the fourth magnet 1252*a*. In addition, the second lens group 1221*b* seated on the first lens assembly 1222*a* may also move in the third direction.

In addition, the second lens assembly 1222*b* on which the fifth magnet 1252*b* is seated may be moved in the third direction (Z-axis direction) by the electromagnetic forces F4A and F4B between the fifth coil 1251*b* and the fifth magnet 1252*b*. In addition, the third lens group 1221*c* seated on the second lens assembly 1222*b* may also move in the third direction.

Therefore, as described above, a focal length or magnification of the optical system may be changed by moving the second lens group 1221*b* and the third lens group 1221*c*. In the embodiment, the magnification may be changed by moving the second lens group 1221*b*. In other words, zooming may be performed. In addition, a focus may be adjusted by moving the third lens group 1221*c*. In other words, auto focusing may be performed. With this configuration, the second camera actuator may be a fixed zoom or a continuous zoom.

Figure 14:
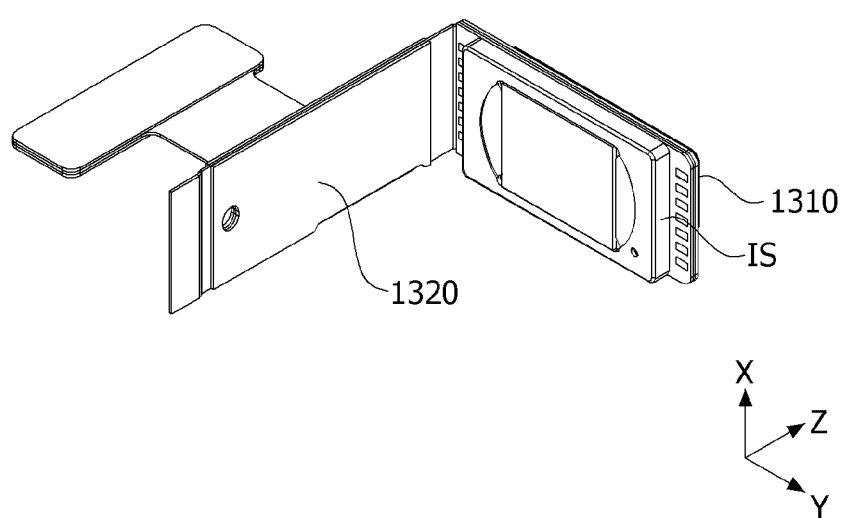
FIG. 14 is a schematic diagram illustrating a circuit board according to the embodiment.

FIG. 14 is a schematic diagram illustrating a circuit board according to the embodiment.

Referring to FIG. 14, as described above, the circuit board 1300 according to the embodiment may include a first circuit board unit 1310 and a second circuit board unit 1320. The first circuit board unit 1310 may be positioned under the base and coupled to the base. In addition, the image sensor IS may be disposed on the first circuit board unit 1310. In addition, the first circuit board unit 1310 and the image sensor IS may be electrically connected.

In addition, the second circuit board unit 1320 may be positioned on a side portion of the base. In particular, the second circuit board unit 1320 may be positioned on a first side portion of the base. Therefore, the second circuit board unit 1320 may be positioned adjacent to the fourth coil positioned adjacent to the first side portion, and thus an electrical connection is easy.

Furthermore, the circuit board 1300 may further include a fixed board (not illustrated) positioned on a side surface thereof. Therefore, even when the circuit board 1300 is made of a flexible material, the circuit board 1300 may be coupled to the base while maintaining stiffness by the fixed board.

The second circuit board unit 1320 of the circuit board 1300 may be positioned on the side portion of the second driving unit 1250. The circuit board 1300 may be electrically connected to the first driving unit and the second driving unit. For example, the electrical connection may be made by the SMT. However, the present invention is not limited to this method.

The circuit board 1300 may include a circuit board having wiring patterns that may be electrically connected, such as a rigid PCB, a flexible PCB, and a rigid flexible PCB. However, the present invention is not limited to these types.

In addition, the circuit board 1300 may be electrically connected to another camera module in the terminal or a processor of the terminal. Therefore, the above-described camera actuator and camera device including the same may transmit and receive various signals in the terminal.

Figure 15:
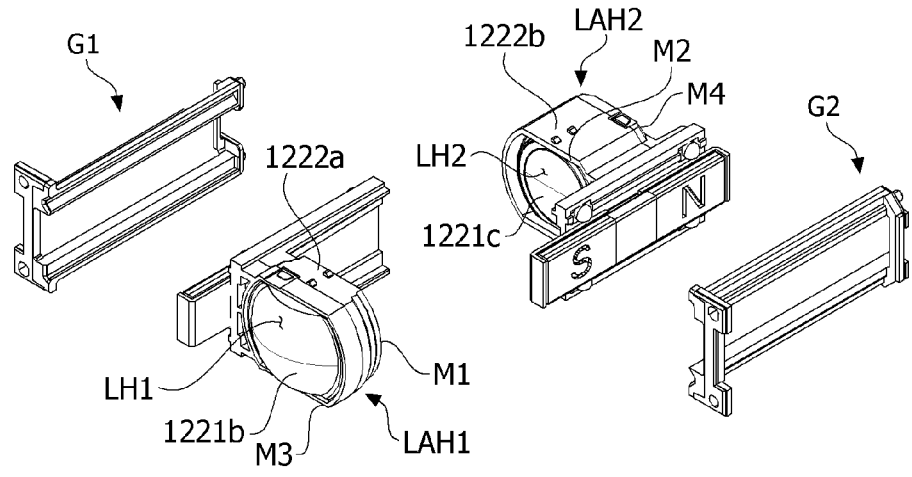
FIG. 15 is a perspective view of a first lens assembly, a first bonding member, a second bonding member, and a second lens assembly according to the embodiment.
Figure 15:
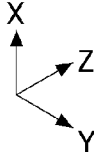
Figure 16:
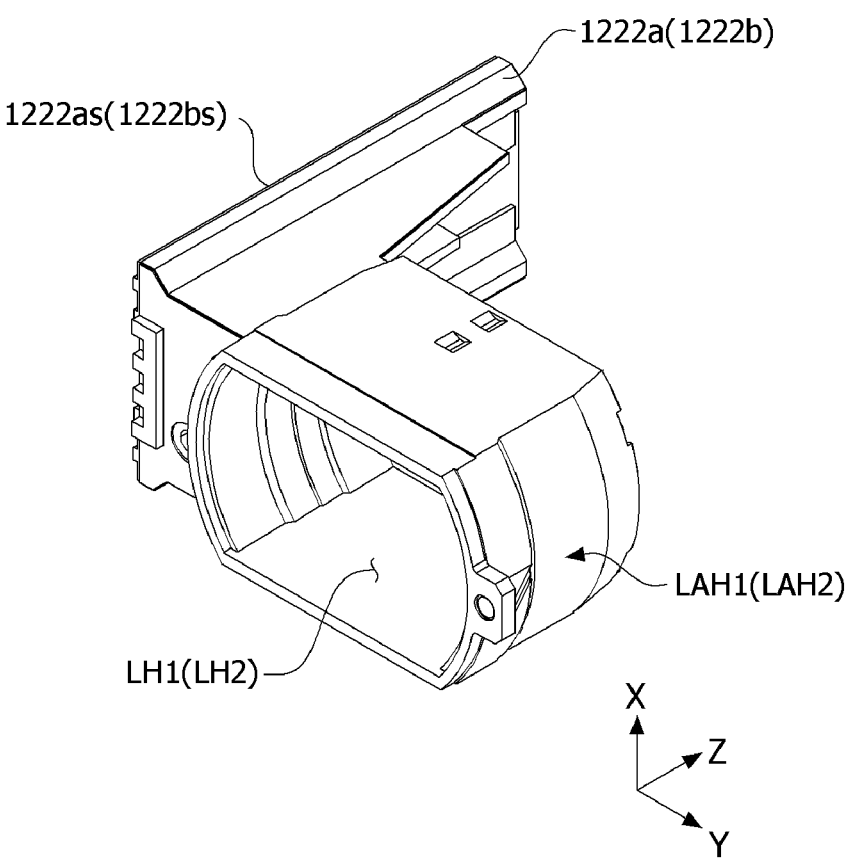
FIG. 16 is a perspective view of the first lens assembly in the second camera actuator according to a first embodiment.
Figure 17:
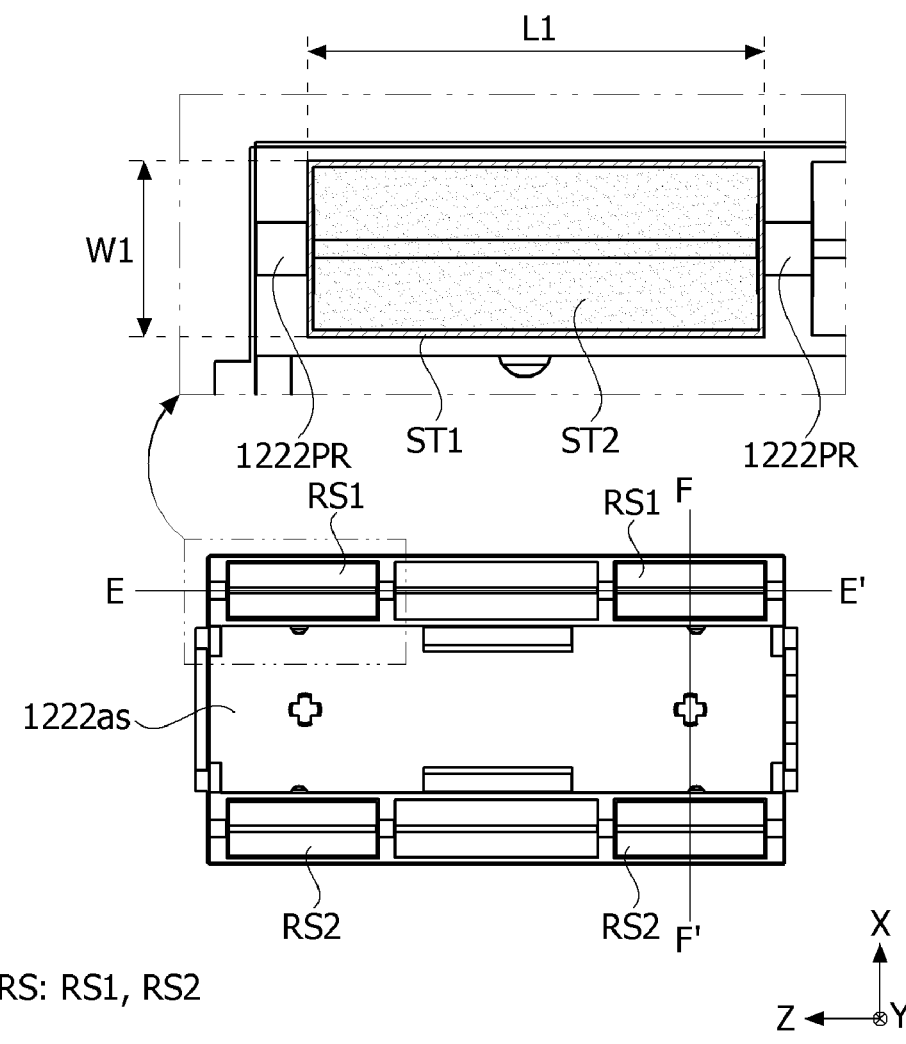
FIG. 17 is a side view of the first lens assembly in the second camera actuator according to the first embodiment.
Figure 18:
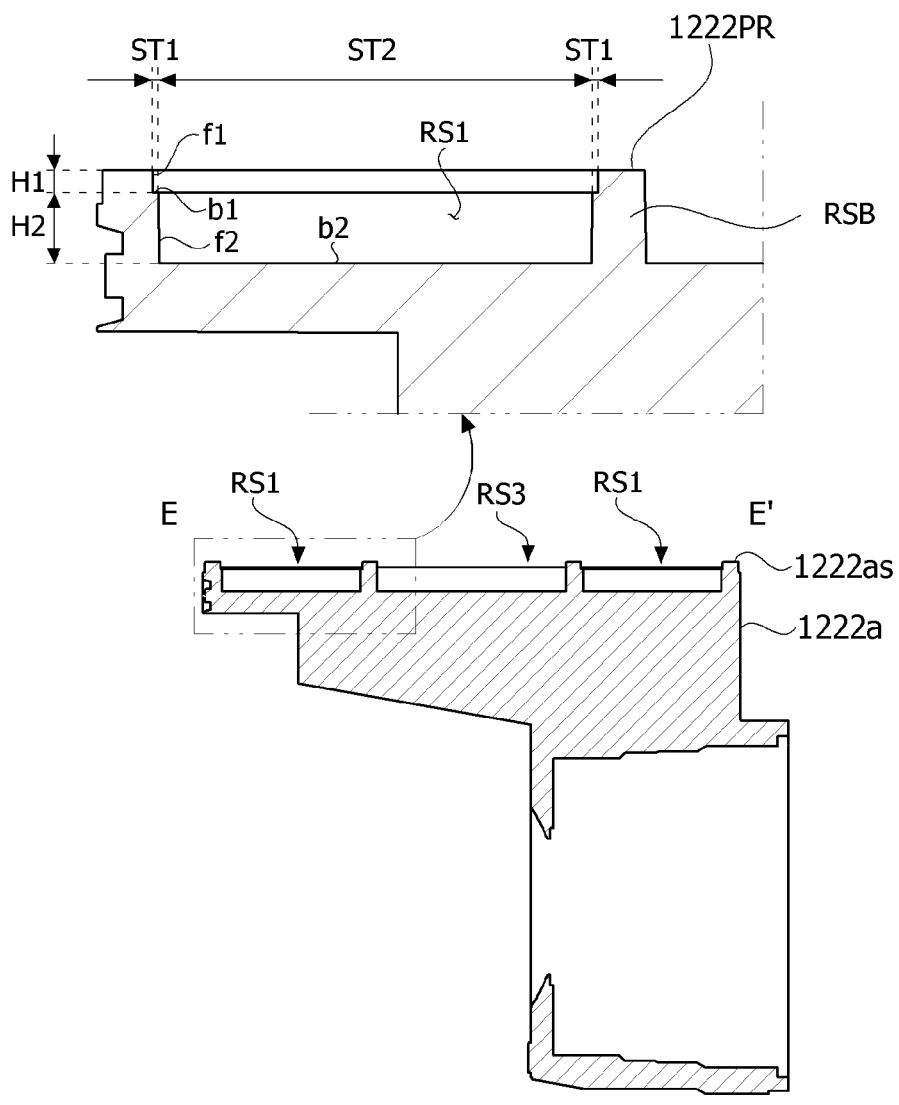
FIG. 18 is a view along line E-E' in FIG. 17.
Figure 19:
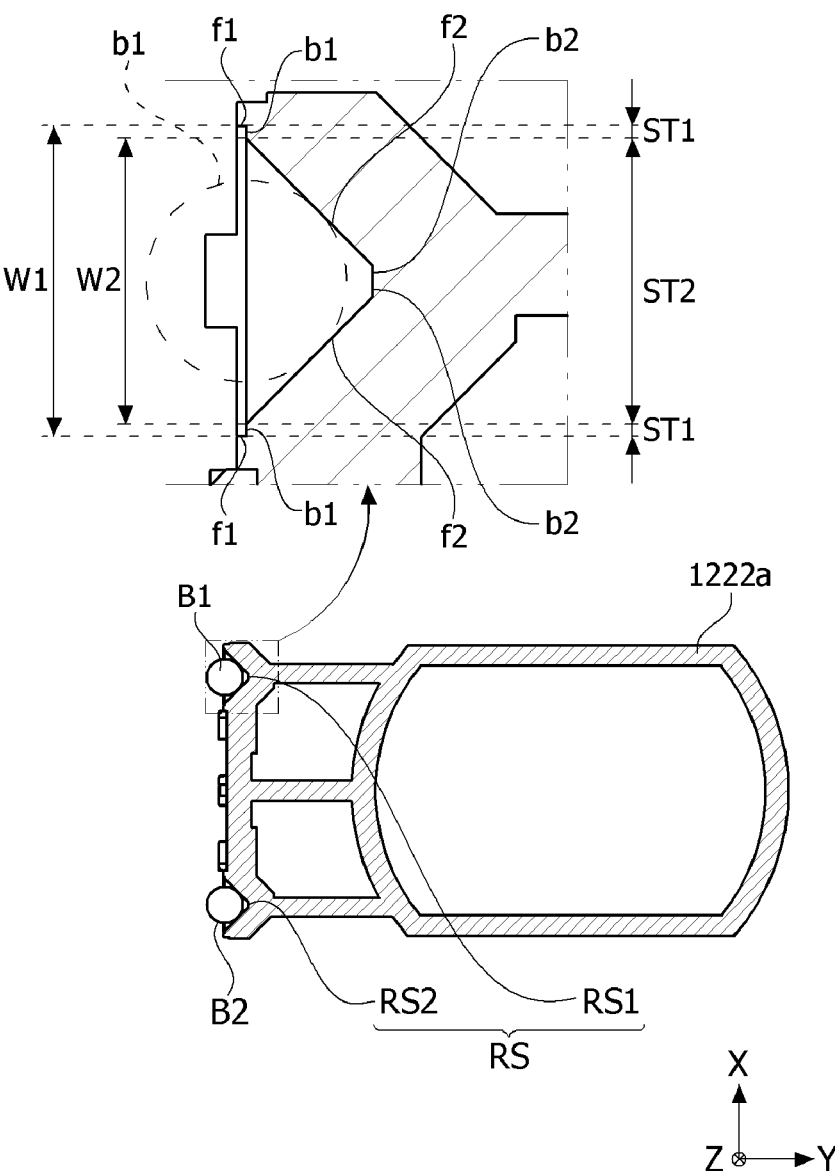
FIG. 19 is a view along line F-F' in FIG. 17.
Figure 20:
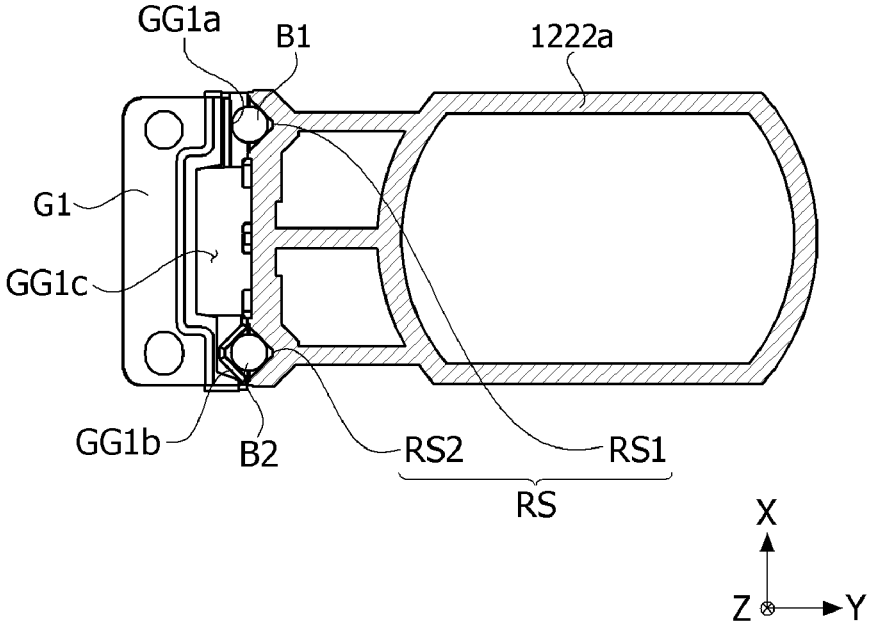
FIG. 20 is a view illustrating the first lens assembly, a first guide unit, a first ball, and a second ball in the second camera actuator according to the first embodiment.

FIG. 15 is a perspective view of a first lens assembly, a first bonding member, a second bonding member, and a second lens assembly according to the embodiment, FIG. 16 is a perspective view of the first lens assembly of the second camera actuator according to a first embodiment, FIG. 17 is a side view of the first lens assembly of the second camera actuator according to the first embodiment, FIG. 18 is a view along line E-E' in FIG. 17, FIG. 19 is a view along line F-F' in FIG. 17, and FIG. 20 is a view illustrating the first lens assembly, a first guide unit, a first ball, and a second ball in the second camera actuator according to the first embodiment.

Referring to FIG. 15, the first lens assembly 1222*a* and the second lens assembly 1222*b* may be disposed to be spaced apart from each other in the optical axis direction (Z-axis direction). In addition, the first lens assembly 1222*a* and the second lens assembly 1222*b* may be moved in the optical axis direction (Z-axis direction) by the second driving unit. For example, an auto focus or zooming function may be performed by moving the first lens assembly 1222*a* and the second lens assembly 1222*b*.

In addition, the first lens assembly 1222*a* may include a first lens holder LAH1 for holding and coupling the second lens group 1221*b*. The first lens holder LAH1 may be coupled to the second lens group 1221*b*. In addition, the first lens holder LAH1 may include a first lens hole LH1 for accommodating the second lens group 1221*b*. In other words, the second lens group 1221*b* including at least one lens may be disposed in the first lens hole LH1. The first guide unit G1 may be disposed to be spaced apart from one side of the first lens holder LAH1. For example, the first guide unit G1 and the first lens holder LAH1 may be sequentially disposed in the second direction (Y-axis direction).

In addition, the second lens assembly 1222*b* may include a second lens holder LAH2 for holding and coupling the third lens group 1221*c*. In addition, the second lens holder LAH2 may include a second lens hole LH2 for accommodating the third lens group 1221*c*. In other words, at least one lens may be disposed in the second lens hole LH2.

The second guide unit G2 may be disposed at the other side of the second lens holder LAH2. The second guide unit G2 may be disposed to face the first guide unit G1.

In the embodiment, at least portions of the first guide unit G1 and the second guide unit G2 may overlap each other in the second direction (Y-axis direction). With this configuration, it is possible to increase the space efficiency of the second driving unit for moving the first and second lens assemblies within the second camera actuator, thereby easily miniaturizing the second camera actuator.

In addition, the second guide unit G2 and the second lens holder LAH2 may be sequentially disposed in a direction opposite to the second direction (Y-axis direction).

The first ball, the fourth coil, and the like may be disposed in the first guide unit G1 as described above, and the second ball, the fifth coil, and the like may be disposed in the second guide unit G2 as described above.

In the embodiment, each of the first lens assembly 1222a and the second lens assembly 1222b may include outer surfaces adjacent to each other. The first lens assembly 1222a may include a first outer surface M1, and the second lens assembly 1222b may include a second outer surface M2. The first outer surface M1 may be a lower surface of the first lens holder LAH1 with respect to the optical axis direction (Z-axis direction). In addition, a third outer surface M3 to be described below may be an upper surface of the first lens holder LAH1. In addition, the second outer surface M2 may be an upper surface of the second lens holder LAH2, and the fourth outer surface M4 may be the lower surface of the second lens holder LAH2.

In addition, at least portions of the first outer surface M1 and the second outer surface M2 may overlap each other in the optical axis direction (Z-axis direction). In the embodiment, at least portions of the first outer surface M1 to the fourth outer surface M4 may overlap each other in the optical axis direction (Z-axis direction).

For example, a bonding member (not illustrated) may be in contact with at least one of the first outer surface M1 and the second outer surface M2.

According to the embodiment, the ball may include the first ball B1 and the second ball B2. In addition, the guide unit may include the first guide unit G1 and the second guide unit G2. The ball may be positioned between the lens assembly and the guide unit. The ball may be positioned between the guide units G1 and G2 and the lens assembly to be described below. Here, the lens assembly may include the first lens assembly 1222a and the second lens assembly 1222b.

A recess in which a ball is seated may be provided in a surface, which faces the guide unit, of an outer surface of each of the first lens assembly 1222a and the second lens assembly 1222b. Furthermore, as described above, the recess may include the first recess RS1 in which the first ball B1 is seated and the second recess RS2 in which the second ball B2 is seated.

Referring to FIGS. 16 to 19, in the second camera actuator according to the first embodiment, the first lens assembly 1222a may include a recess RS which faces the guide unit (first guide unit) and in which the ball is seated. As described above, the recess RS may include the first recess RS1 disposed on an upper side portion thereof and the second recess RS2 on a lower side portion thereof. Furthermore, the second lens assembly 1222a may also include the recess RS which faces the guide unit (second guide unit) and in which the ball is seated. The following description will be made based on the first guide unit and the first lens assembly. However, contents to be described below may be applied to at least one of the first guide unit and the second guide unit. In addition, the contents to be described below may be applied to at least one of the first lens assembly and the second lens assembly. In addition, the recess RS may be positioned on a first assembly side surface 1222bs of the first lens assembly 1222a. The first assembly side surface 1222bs may be a surface facing the first guide unit. In addition, the recess RS may be positioned on a second assembly side surface 1222bs of the second lens assembly 1222b. The second assembly side surface 1222bs may be a surface facing the second guide unit.

In addition, a length L1 of the recess RS according to the embodiment in the third direction (Z-axis direction or longitudinal direction) may be larger than a width W1 thereof in the first direction (X-axis direction or width direction). With this configuration, the ball seated in the recess RS may move a long distance in the third direction (Z-axis direction). In other words, the camera actuator may provide a long stroke. Furthermore, the camera actuator may have reduced thickness or width in the first direction. Therefore, since a thickness of an electronic device on which the camera actuator is mounted can be easily reduced, it is possible to achieve miniaturization.

In the first lens assembly 1222a of the camera actuator according to the first embodiment, the recess RS1 and RS2 may include a first stepped portion ST1 and a second stepped portion ST2.

The first stepped portion ST1 may be disposed along an edge of the recess. In addition, the second stepped portion ST2 may be disposed inside the first stepped portion ST1. In addition, at least a portion of the second stepped portion ST2 may be surrounded by the first stepped portion ST1.

According to the embodiment, the first stepped portion ST1 may include a first side surface f1 and a first bottom surface b1. The first side surface f1 may be positioned outside the first bottom surface b1. The first side surface f1 may be a surface positioned at an outermost side of the recess RS.

In addition, the first bottom surface b1 may come into contact with the first side surface f1 inside the first side surface f1. The first side surface f1 may be perpendicular to the first bottom surface b1 or may be an inclined surface. With this configuration, shapes of the plurality of recesses (including the first recess and the second recess) may be the same or similar to each other as will be described below. Therefore, the first lens assembly 1222a and the second lens assembly 1222b may move in the optical axis direction (Z-axis direction) accurately and with high efficiency by the first ball B1 and the second ball B2.

Furthermore, the second stepped portion ST2 may include a second side surface f2 and a second bottom surface b2. The second side surface f2 may come into contact with the first bottom surface b1 and may be positioned inside the first bottom surface b1.

In addition, the second bottom surface b2 may come into contact with the second side surface f2 and may be positioned under the second side surface f2. The second side surface f2 may be inclined with respect to the second bottom surface b2. With this configuration, the ball (first ball or second ball) may be easily seated on the second side surface f2. Therefore, the second side surface f2 may come into contact with the ball.

In addition, a height H1 of the first stepped portion ST1 may be smaller than a height H2 of the second stepped portion ST2. Therefore, it is possible to easily secure a seating space for the ball through the second stepped portion ST2 and at the same time, implement an accurate stroke by making depths of the plurality of recesses RS the same.

In addition, the first side surface f1 may surround the first bottom surface b1, the second side surface f2, and the second bottom surface b2. Here, an inward direction will be described with respect to a center of each recess. For example, a direction from the recess toward a center axis is referred to as "inward." In addition, a direction opposite to the direction toward the center axis or a direction far from the center axis is referred to as "outward direction."

Furthermore, the first stepped portion ST1 according to the embodiment may have a closed loop shape. For example, the first stepped portion ST may have a closed loop shape on a ZX plane. Due to this shape, as described above, the shape of the first ball due to the recess becomes the same or almost similar, and it is possible to suppress the separation of the ball.

In addition, as will be described below, the first stepped portion ST1 may have an open loop shape. This will be described below.

In addition, the first lens assembly may include assembly protruding portions 1222PR in the longitudinal direction (Z-axis direction) disposed with the recess RS interposed therebetween. In other words, the first recess RS1 or the second recess RS2 may be positioned between the protruding portions 1222PR spaced apart from each other in the third direction (Z-axis direction).

In addition, the assembly protruding portion 1222PR may be disposed outside the first recess RS1 or the second recess RS2. In addition, the assembly protruding portion 1222PR may not overlap the first recess RS1 or the second recess RS2 in the third direction (Z-axis direction).

The assembly protruding portion 1222PR may prevent the ball (the first ball or the second ball) seated on the second stepped portion ST2 from being separated to the outside. For example, in order to effectively suppress the ball from being separated, the assembly protruding portion 122PR may be positioned on a bisector line of the recess RS in the first direction (X-axis direction).

In addition, since the first stepped portion ST according to the embodiment may be positioned outside the second stepped portion ST2, a maximum width W1 of the first stepped portion ST1 may be larger than a maximum width W2 of the stepped portion ST2.

Furthermore, according to the embodiment, the first and second lens assemblies may include a third recess RS3 disposed between the first recesses RS1 or the second recesses RS2 spaced apart each other in the third direction (Z-axis direction). Unlike the first and second recesses, the third recess RS3 does not have a structure of the first and second stepped portions. Through the third recess RS3, it is possible to reduce a weight of the lens assembly and easily manufacture the lens assembly.

Furthermore, the first ball B1 or the second ball B2 may be positioned between the lens assembly and the guide unit. For example, the first ball B1 or the second ball B2 may be positioned between the first lens assembly 1222a and the first guide unit G1. Alternatively, the first ball B1 or the second ball B2 may be positioned between the second lens assembly 1222b and the second guide unit G2.

Figure 21:
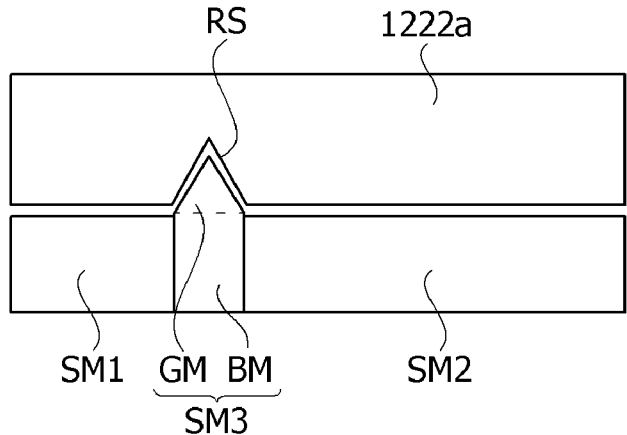
FIG. 21 is a view for describing a method of forming a recess according to the embodiment.

FIG. 21 is a view for describing a method of forming a recess according to the embodiment.

Referring to FIG. 21, the recess according to the embodiment may be formed by a first mold member SM1, a second mold member SM2, and a third mold member SM3. For example, the second mold member SM2 may be positioned between the first mold member SM1 and the third mold member SM3.

In addition, the second mold member SM2 may include a base member BM and a protruding member GM disposed on the base member BM. For example, the second mold member SM2 may be a core pin, and the first mold member SM1 and the third mold member SM3 may be core support plates.

In addition, the recess RS of the first lens assembly 1222a disposed on the upper side portion of the lens assembly may be formed by the second mold member SM2. In this case, the second mold member SM2 may be easily changed between the first mold member SM1 and the third mold member SM3.

In addition, the first mold member SM1 and the third mold member SM3 may have a step from the protruding member GM of the second mold member SM2. Therefore, the above-described first and second stepped portions may be formed.

Therefore, the plurality of recesses RS of the first lens assembly 1222a may have the same height, width, and length as described above. Therefore, since the frictional force or the like applied to the plurality of balls seated in the plurality of recesses RS is uniform, the first lens assembly 1222a may more accurately and easily move in the optical axis direction. In other words, the camera actuator can easily implement a long stroke. In addition, this description may also be applied to the second lens assembly in the same manner as described above.

Figure 22:
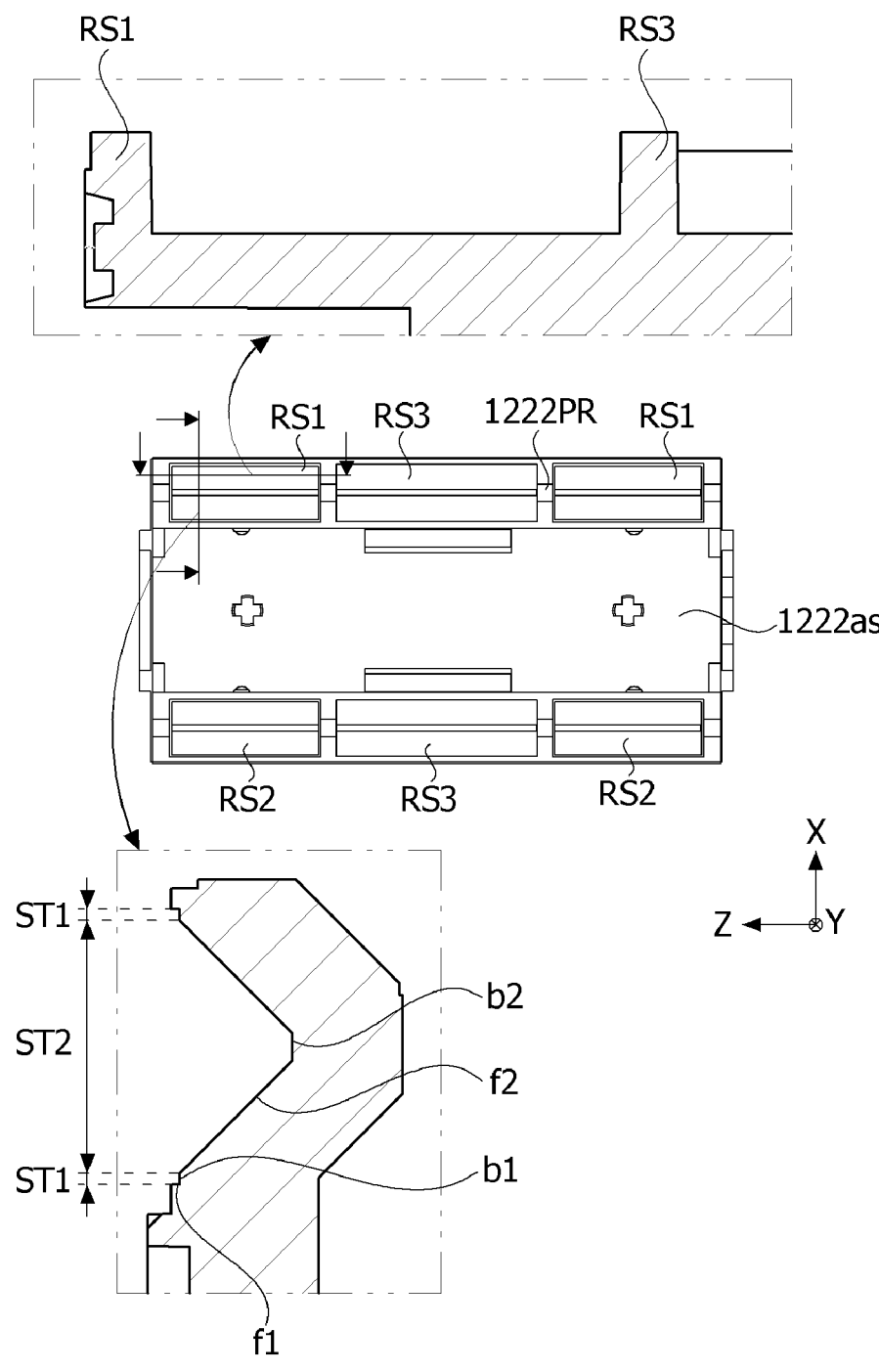
FIG. 22 is a side view of a first lens assembly in a second camera actuator according to a second embodiment.

FIG. 22 is a side view of a first lens assembly of a second camera actuator according to a second embodiment.

Referring to FIG. 22, in the second camera actuator according to the second embodiment, the first lens assembly 1222a may include the recess RS which faces the guide unit (first guide unit) and in which the ball is seated. The above contents other than the following description may be applied in the same manner. As described above, the recess RS may include the first recess RS1 at the top and the second recess RS2 at the bottom. Furthermore, the second lens assembly 1222a may also include the recess RS which faces the guide unit (second guide unit) and in which the ball is seated. The following description will be made based on the first guide unit and the first lens assembly. In addition, contents to be described below may be applied to at least one of the first guide unit and the second guide unit. In addition, the contents to be described below may be applied to at least one of the first lens assembly and the second lens assembly.

In addition, the recess RS may be positioned on a first assembly side surface 1222bs of the first lens assembly 1222a. The first assembly side surface 1222bs may be a surface facing the first guide unit. In addition, the recess RS may be positioned on the second assembly side surface of the second lens assembly 1222b. The second assembly side surface may be a surface facing the second guide unit.

In addition, a length of the recess RS according to the embodiment in the third direction (Z-axis direction or longitudinal direction) may be larger than a width thereof in the first direction (X-axis direction or width direction). With this configuration, the ball seated in the recess RS may move a long distance in the third direction (Z-axis direction). In other words, the camera actuator may provide a long stroke. Furthermore, the camera actuator may have reduced thickness or width in the first direction. Therefore, since a thickness of an electronic device on which the camera actuator is mounted can be easily reduced, it is possible to achieve miniaturization.

In the first lens assembly 1222a of the camera actuator according to the second embodiment, the recess RS1 and RS2 may include the first stepped portion ST1 and the second stepped portion ST2.

The first stepped portion ST1 may be disposed along an edge of the recess. In addition, the second stepped portion ST2 may be disposed inside the first stepped portion ST1. In addition, at least a portion of the second stepped portion ST2 may be surrounded by the first stepped portion ST1.

According to the embodiment, the first stepped portion ST1 may include a first side surface f1 and a first bottom surface b1. The first side surface f1 may be positioned outside the first bottom surface b1. The first side surface f1 may be a surface positioned at an outermost side of the recess RS.

In addition, the first bottom surface b1 may come into contact with the first side surface f1 inside the first side surface f1. The first side surface f1 may be perpendicular to the first bottom surface b1 or may be an inclined surface. With this configuration, shapes of the plurality of recesses (including the first recess and the second recess) may be the same or similar to each other as will be described below. Therefore, the first lens assembly 1222a and the second lens assembly 1222b may move in the optical axis direction (Z-axis direction) accurately and with high efficiency by the first ball B1 and the second ball B2.

Furthermore, the second stepped portion ST2 may include a second side surface f2 and a second bottom surface b2. The second side surface f2 may come into contact with the first bottom surface b1 and may be positioned inside the first bottom surface b1.

In addition, the second bottom surface b2 may come into contact with the second side surface f2 and may be positioned under the second side surface f2. The second side surface f2 may be inclined with respect to the second bottom surface b2. With this configuration, the ball (first ball or second ball) may be easily seated on the second side surface f2. Therefore, the second side surface f2 may come into contact with the ball.

However, the first stepped portion ST1 may extend in at least one of the longitudinal direction (Z-axis direction) or the width direction (X-axis direction). In the second embodiment, the first stepped portion ST may extend in the first direction (X-axis direction). In addition, the first stepped portions ST1 of the recess RS may be disposed to be spaced apart from each other in the third direction (Z-axis direction). Therefore, unlike the first embodiment, the first stepped portion ST may be positioned at only left and right sides of the recess RS and may not be positioned on upper and lower side portions thereof. Therefore, the first stepped portions ST may overlap each other in the third direction (Z-axis direction) in each of the first recess RS1 and the second recess RS2.

In this case, a maximum width of the second stepped portion ST2 in the first direction (X-axis direction) may be equal to a maximum width of the first stepped portion ST1 in the first direction (X-axis direction).

Furthermore, the first stepped portion ST1 may surround the second stepped portion ST2 in an open loop on an XZ plane.

Figure 23:
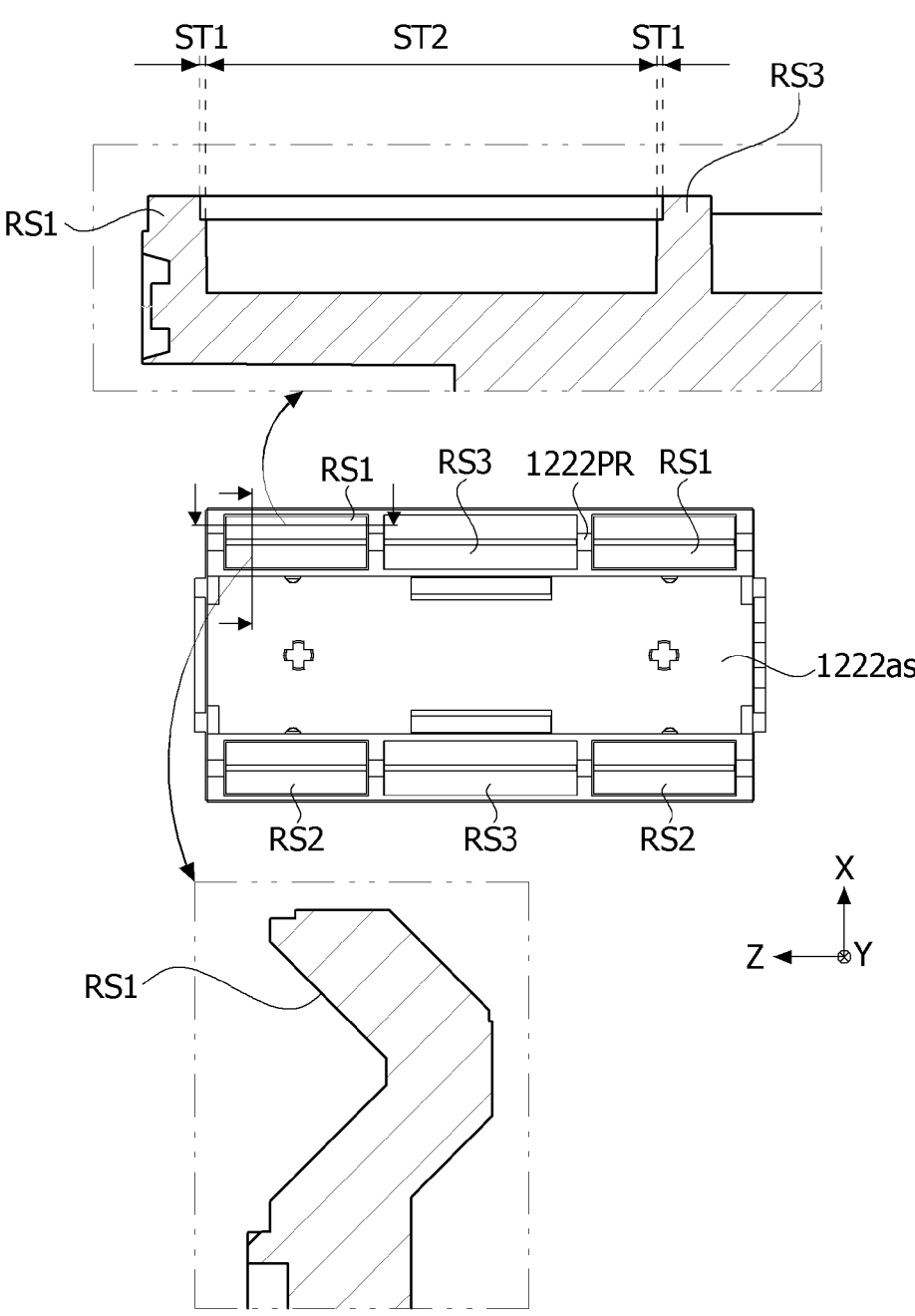
FIG. 23 is a side view of a first lens assembly in a second camera actuator according to a third embodiment.

FIG. 23 is a side view of a first lens assembly of a second camera actuator according to a third embodiment.

Referring to FIG. 23, in the second camera actuator according to the third embodiment, the first lens assembly 1222a may include the recess RS which faces the guide unit (first guide unit) and in which the ball is seated. The above contents other than the following description may be applied in the same manner. As described above, the recess RS may include the first recess RS1 disposed on an upper side portion thereof and the second recess RS2 on a lower side portion thereof. Furthermore, the second lens assembly 1222a may also include the recess RS which faces the guide unit (second guide unit) and in which the ball is seated. The following description will be made based on the first guide unit and the first lens assembly. In addition, contents to be described below may be applied to at least one of the first guide unit and the second guide unit. In addition, the contents to be described below may be applied to at least one of the first lens assembly and the second lens assembly.

The recess RS may be positioned on the first assembly side surface 1222bs of the first lens assembly 1222a. The first assembly side surface 1222bs may be a surface facing the first guide unit. In addition, the recess RS may be positioned on a second assembly side surface 1222bs of the second lens assembly 1222b. The second assembly side surface 1222bs may be a surface facing the second guide unit.

In addition, a length of the recess RS according to the embodiment in the third direction (Z-axis direction or longitudinal direction) may be larger than a width thereof in the first direction (X-axis direction or width direction). With this configuration, the ball seated in the recess RS may move a long distance in the third direction (Z-axis direction). In other words, the camera actuator may provide a long stroke. Furthermore, the camera actuator may have reduced thickness or width in the first direction. Therefore, since a thickness of an electronic device on which the camera actuator is mounted can be easily reduced, it is possible to achieve miniaturization.

In the first lens assembly 1222a of the camera actuator according to the third embodiment, the recess RS1 and RS2 may include the first stepped portion ST1 and the second stepped portion ST2.

The first stepped portion ST1 may be disposed along an edge of the recess. In addition, the second stepped portion ST2 may be disposed inside the first stepped portion ST1. In addition, at least a portion of the second stepped portion ST2 may be surrounded by the first stepped portion ST1. A portion of the second stepped portion ST2 may be positioned between the separated first stepped portions ST1.

According to the embodiment, the first stepped portion ST1 may include a first side surface f1 and a first bottom surface b1. The first side surface f1 may be positioned outside the first bottom surface b1. The first side surface f1 may be a surface positioned at an outermost side of the recess RS.

In addition, the first bottom surface b1 may come into contact with the first side surface f1 inside the first side surface f1. The first side surface f1 may be perpendicular to the first bottom surface b1 or may be an inclined surface. With this configuration, shapes of the plurality of recesses (including the first recess and the second recess) may be the same or similar to each other as will be described below. Therefore, the first lens assembly 1222a and the second lens assembly 1222b may move in the optical axis direction (Z-axis direction) accurately and with high efficiency by the first ball B1 and the second ball B2.

Furthermore, the second stepped portion ST2 may include a second side surface f2 and a second bottom surface b2. The second side surface f2 may come into contact with the first bottom surface b1 and may be positioned inside the first bottom surface b1.

In addition, the second bottom surface b2 may come into contact with the second side surface f2 and may be positioned under the second side surface f2. The second side surface f2 may be inclined with respect to the second bottom surface b2. With this configuration, the ball (first ball or second ball) may be easily seated on the second side surface f2. Therefore, the second side surface f2 may come into contact with the ball.

However, the first stepped portion ST1 may extend in at least one of the longitudinal direction (Z-axis direction) or the width direction (X-axis direction). In the third embodiment, the first stepped portion ST may extend in the third direction (Z-axis direction). In addition, the first stepped portions ST1 of the recess RS may be disposed to be spaced apart from each other in the first direction (X-axis direction). Therefore, unlike the first embodiment, the first stepped portion ST may be positioned on only the upper and lower side portions of the recess RS and may not be positioned at the left and right sides thereof. Therefore, the first stepped portions ST may overlap each other in the first direction (X-axis direction) in each of the first recess RS1 and the second recess RS2.

In this case, a maximum width of the second stepped portion ST2 in the third direction (Z-axis direction) may be equal to a maximum width of the first stepped portion ST1 in the third direction (Z-axis direction).

Furthermore, the first stepped portion ST1 may surround the second stepped portion ST2 in an open loop on an XZ plane.

Figure 24:
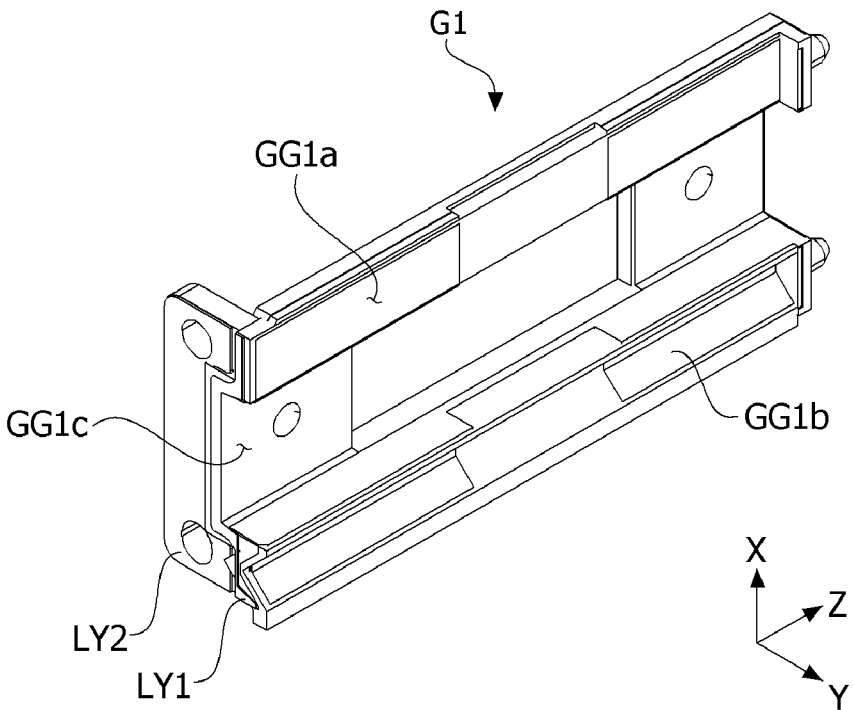
FIG. 24 is a perspective view illustrating the first guide unit according to one embodiment.
Figure 25:
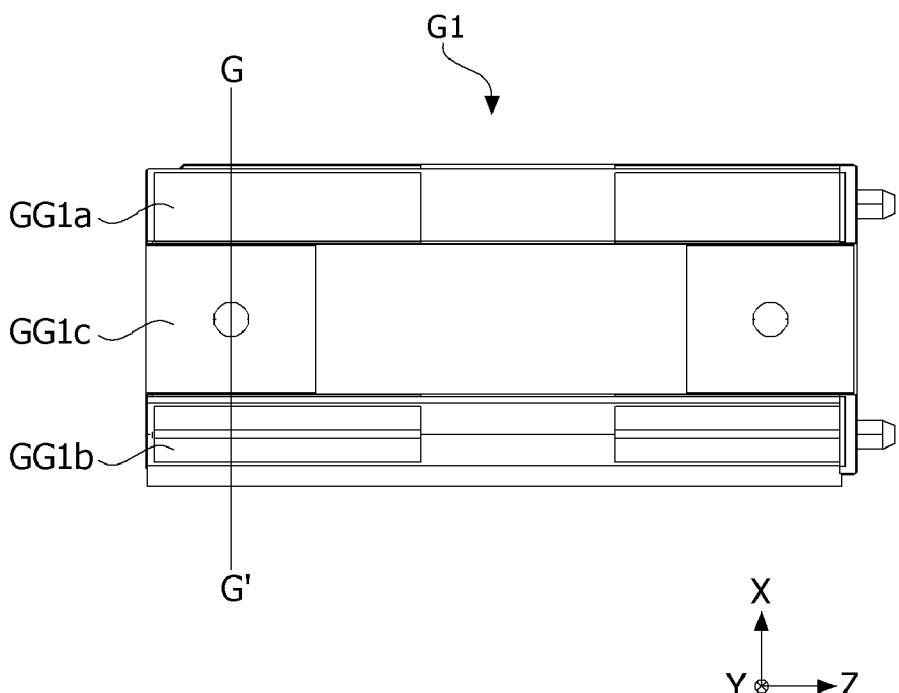
FIG. 25 is a side view illustrating the first guide unit according to one embodiment.
Figure 26:
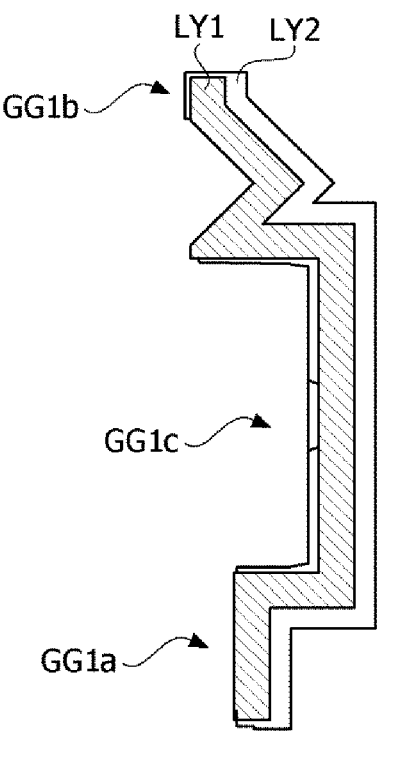
FIG. 26 is a view along line G-G' in FIG. 25.
Figure 26:
Figure 27:
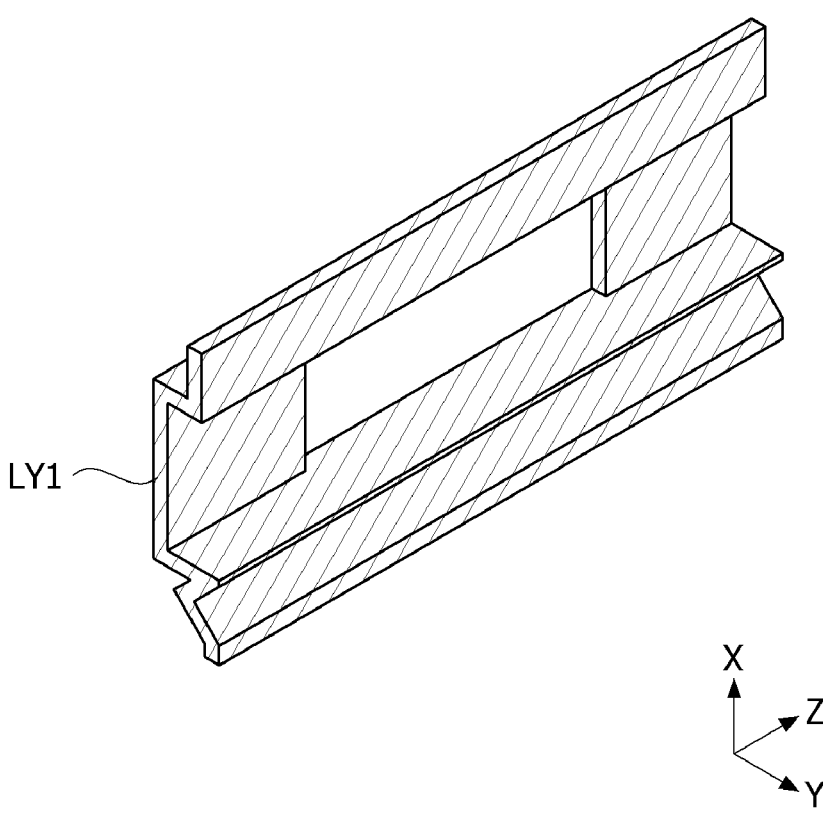
FIG. 27 is a perspective view of a first layer of the first guide unit according to one embodiment.

FIG. 24 is a perspective view illustrating the first guide unit according to one embodiment, FIG. 25 is a side view illustrating the first guide unit according to one embodiment, FIG. 26 is a view along line G-G' in FIG. 25, and FIG. 27 is a perspective view of a first layer of the first guide unit according to one embodiment.

Referring to FIGS. 24 to 26, the guide unit may include a guide groove in which the first ball and the second ball are seated. The guide groove may correspond to each of the above-described first recess and second recess. The guide groove may include a first guide groove and a second guide groove. The first guide unit G1 and the second guide unit G2 may include the first guide grooves GG1a and GG2a facing the first recess RS1. In addition, the first guide unit G1 and the second guide unit G2 may include second guide grooves GG1b and GG2b facing a second recess RS2. The first guide grooves GG1a and GG2a and the second guide grooves GG1b and GG2b may be grooves extending in the third direction (Z-axis direction). In addition, the first guide grooves GG1a and GG2a and the second guide grooves GG1b and GG2b may have different shapes. For example, the first guide grooves GG1a and GG2a may be grooves having inclined side surfaces, and the second guide grooves GG1b and GG2b may be grooves having side surfaces perpendicular to lower surfaces thereof. In the drawings, the first guide unit G1 is illustrated, and the following description will be made based on this. All descriptions of the first guide unit G1 may be applied to the second guide unit G2 in the same manner.

Furthermore, the first guide unit G1 and the second guide unit G2 may include third guide grooves GG1c and GG2c disposed between the first guide grooves GG1a and GG2a and the second guide grooves GG1b and GG2b. The ball may not be seated in the third guide grooves GG1c and GG2c. A second driving coil may be seated in the third guide grooves GG1c and GG2c. The second driving coil may be disposed on side walls of the first side portion and the second side portion to which the guide unit is disposed adjacent. Therefore, in the second camera actuator according to the embodiment, the lens assembly may be coupled to the second driving magnet and may move in the optical axis direction.

The third guide grooves GG1c and GG2c may have a larger height than the first guide grooves GG1a and GG2a and the second guide grooves GG1b and GG2b.

In addition, the first ball may be seated in the first guide grooves GG1a and GG2a. In addition, the first ball may move in the optical axis direction (Z-axis direction). The second ball may be seated in the second guide grooves GG1b and GG2b. In addition, the second ball may move in the optical axis direction (Z-axis direction).

The guide unit (the first guide unit and the second guide unit) according to the embodiment may include a first layer LY1 inserted therein and a second layer LY2 surrounding the first layer LY1. At least a portion of the first layer LY1 may be covered by the second layer LY2. The first layer LY1 may be made of metal or the like. For example, the first layer LY1 may be made of stainless steel (SUS). The second layer LY2 may be made of a material such as resin.

Furthermore, the first layer LY1 may be exposed at the guide groove. With this configuration, a surface roughness of the first layer LY1 may be smaller than a surface roughness of the second layer LY2. For example, a surface roughness Ra may be 0.025 or less. With this configuration, the first ball and the second ball seated on the first layer LY1 may be easily moved in the optical axis direction by a smaller friction force due to the flatness of the guide unit. Furthermore, it is possible to improve straightness. In addition, the first layer LY1 may be positioned under the second layer LY2 in the guide groove.

Figure 28:
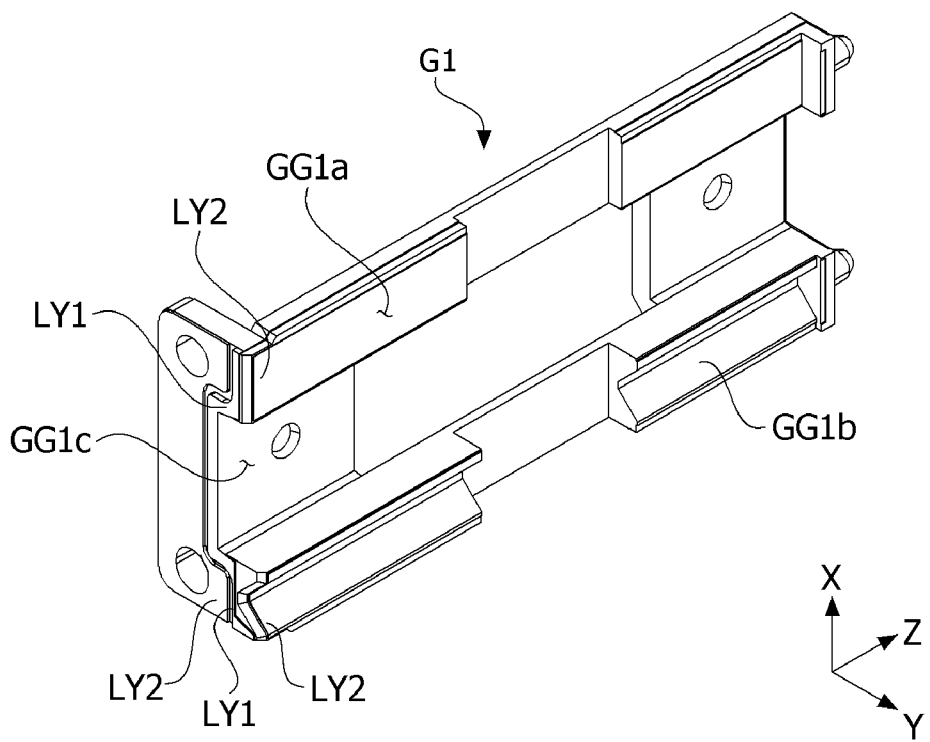
FIG. 28 is a perspective view of a first guide unit according to another embodiment.

FIG. 28 is a perspective view of a first guide unit according to another embodiment.

Referring to FIG. 28, according to another embodiment, the guide unit may include a guide groove in which the first ball and the second ball are seated. The guide groove may correspond to each of the above-described first recess and second recess. The guide groove may include a first guide groove and a second guide groove. The first guide unit G1 and the second guide unit G2 may include the first guide grooves GG1a and GG2a facing the first recess RS1. In addition, the first guide unit G1 and the second guide unit G2 may include second guide grooves GG1b and GG2b facing a second recess RS2. The first guide grooves GG1a and GG2a and the second guide grooves GG1b and GG2b may be grooves extending in the third direction (Z-axis direction). In addition, the first guide grooves GG1a and GG2a and the second guide grooves GG1b and GG2b may be grooves with different shapes. For example, the first guide grooves GG1a and GG2a may be grooves having inclined side surfaces, and the second guide grooves GG1b and GG2b may be grooves having side surfaces perpendicular to lower surfaces thereof. In the drawings, the first guide unit G1 is illustrated, and the following description will be made based on this. All descriptions of the first guide unit G1 may be applied to the second guide unit G2 in the same manner.

Furthermore, the first guide unit G1 and the second guide unit G2 may include third guide grooves GG1c and GG2c disposed between the first guide grooves GG1a and GG2a and the second guide grooves GG1b and GG2b. The ball may not be seated in the third guide grooves GG1c and GG2c. A second driving coil may be seated in the third guide grooves GG1c and GG2c. The second driving coil may be disposed on side walls of the first side portion and the second side portion to which the guide unit is disposed adjacent. Therefore, in the second camera actuator according to the embodiment, the lens assembly may be coupled to the second driving magnet and may move in the optical axis direction.

The third guide grooves GG1c and GG2c may have a larger height than the first guide grooves GG1a and GG2a and the second guide grooves GG1b and GG2b.

In addition, the first ball may be seated in the first guide grooves GG1a and GG2a. In addition, the first ball may move in the optical axis direction (Z-axis direction). The second ball may be seated in the second guide grooves GG1*b* and GG2*b*. In addition, the second ball may move in the optical axis direction (Z-axis direction).

Likewise, the guide unit (the first guide unit and the second guide unit) according to the embodiment may include the first layer LY1 inserted therein and the second layer LY2 surrounding the first layer LY1. At least a portion of the first layer LY1 may be covered by the second layer LY2. The first layer LY1 may be made of metal or the like. For example, the first layer LY1 may be made of stainless steel (SUS). The second layer LY2 may be made of a material such as resin.

The second layer LY2 may be positioned above and under the first layer LY1. At least a portion of the first layer LY1 may be exposed. However, the second layer LY2 may be positioned in a region in which the first ball and the second ball move.

Therefore, the second layer LY2, the first layer LY1, and the second layer LY2 may be disposed sequentially in the second direction. Furthermore, the second layer LY2 may be thinly disposed on the first layer LY1. For example, the second layer LY2 in contact with the first ball or the second ball may be thinner than another second layer. With this configuration, it is possible to reduce the surface roughness of the second layer LY2, thereby reducing the frictional force caused by the movement of the first ball and the second ball. Therefore, the first ball and the second ball may easily move in the optical axis direction by a small friction force.

Figure 29:
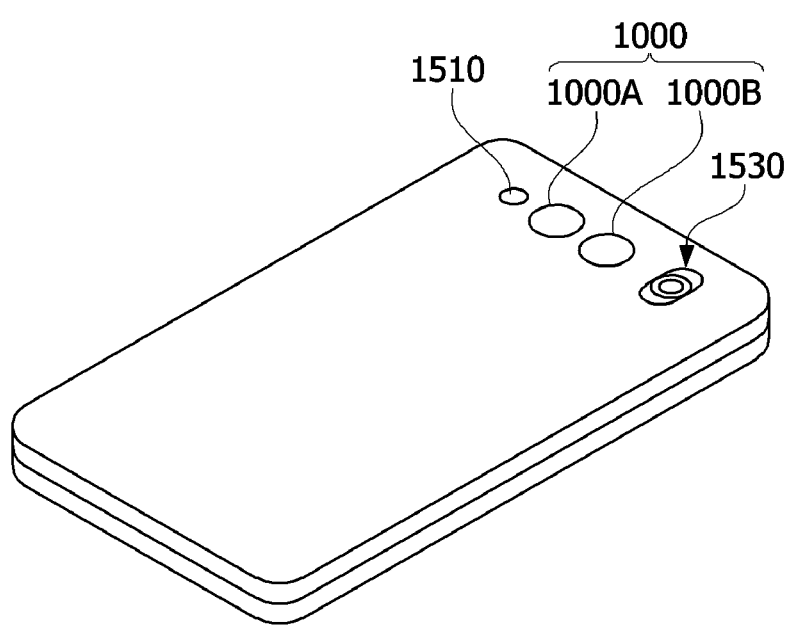
FIG. 29 is a perspective view of a mobile terminal to which the camera device according to the embodiment is applied.

FIG. 29 is a perspective view of a mobile terminal to which the camera device according to the embodiment is applied.

Referring to FIG. 29, a mobile terminal 1500 according to the embodiment may include the camera device 1000, a flash module 1530, and an AF device 1510, which are provided on a rear surface thereof.

The camera device 1000 may include an image photographing function and an AF function. For example, the camera device 1000 may include the AF function using an image.

The camera device 1000 processes an image frame of a still image or a moving image obtained by an image sensor in a photographing mode or a video call mode.

The processed image frame may be displayed on a predetermined display and stored in a memory. A camera (not illustrated) may also be disposed on a front surface of a body of the mobile terminal.

For example, the camera device 1000 may include a first camera device 1000A and a second camera device 1000B, and the first camera device 1000A may implement an OIS function together with an AF or zooming function. In addition, the second camera device 1000B may implement the AF, zooming, and OIS functions. In this case, since the first camera device 1000A includes both the above-described first camera actuator and second camera actuator, it is possible to easily miniaturize the camera device by changing an optical path.

The flash module 1530 may include a light emitting device for emitting light therein. The flash module 1530 may be operated by a camera operation of the mobile terminal or a user's control.

The AF device 1510 may include one of a package of a surface light emitting laser device as a light emitting unit.

The AF device 1510 may include the AF function using a laser. The AF device 1510 may be mainly used in a condition in which the AF function using the image of the camera device 1000 is degraded, for example, in an environment that is close to 10 m or less or dark.

The AF device 1510 may include a light emitting unit including a vertical cavity surface emitting laser (VCSEL) semiconductor device and a light receiving unit for converting light energy into electrical energy, such as a photodiode.

Figure 30:
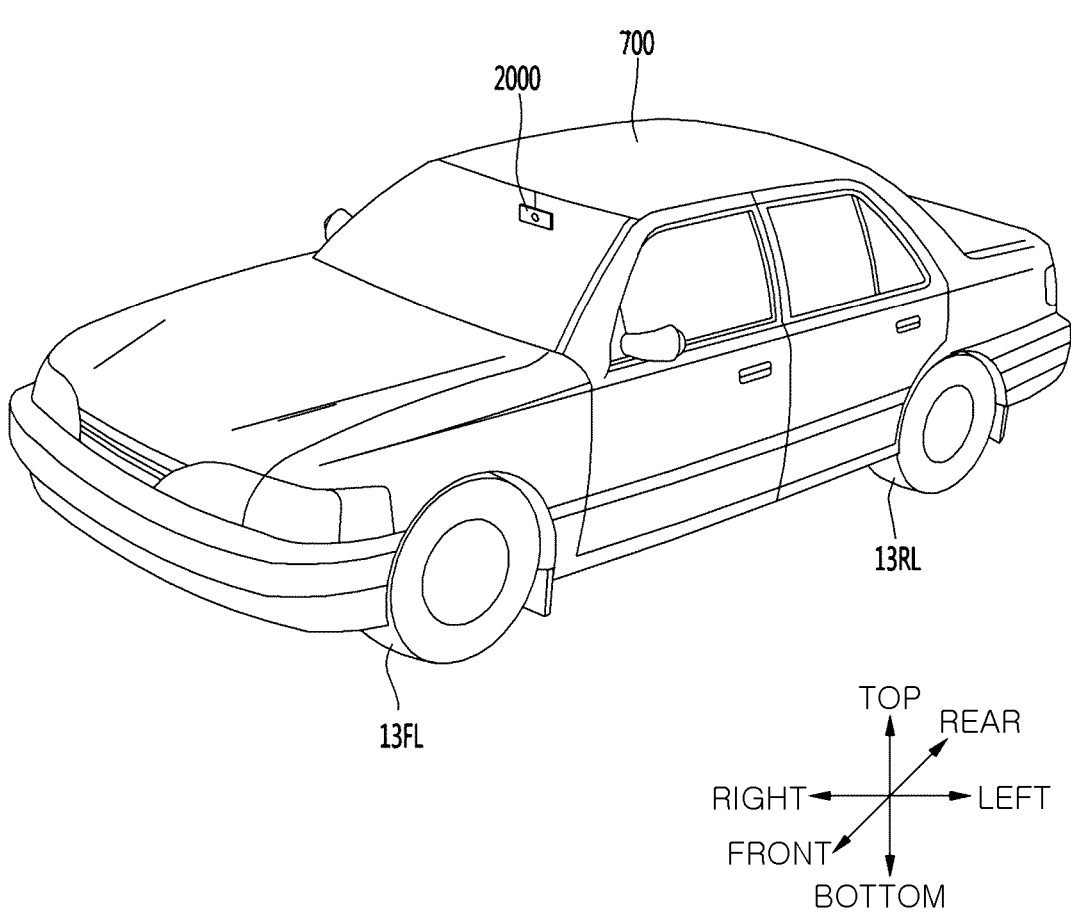
FIG. 30 is a perspective view of a vehicle to which the camera device according to the embodiment is applied.

FIG. 30 is a perspective view of a vehicle to which the camera device according to the embodiment is applied.

For example, FIG. 30 is a view illustrating an exterior of a vehicle including a vehicle driver assistance device to which the camera device 1000 according to the embodiment is applied.

Referring to FIG. 30, a vehicle 700 according to the embodiment may include wheels 13FL and 13FR rotated by a power source and a predetermined sensor. Although the sensor may be a camera sensor 2000, the present invention is not limited thereto.

The camera 2000 may be a camera sensor to which the camera device 1000 according to the embodiment is applied. The vehicle 700 according to the embodiment may acquire image information through the camera sensor 2000 for capturing a forward image or a surrounding image, determine a situation in which a lane line is not identified using the image information, and generate a virtual lane line when the lane line is not identified.

For example, the camera sensor 2000 may acquire a forward image by capturing a view in front of the vehicle 700, and a processor (not illustrated) may acquire image information by analyzing an object included in the front image.

For example, when a lane line, an adjacent vehicle, a traveling obstacle, and objects, such as a median, a curb, or a tree corresponding to an indirect road mark, are captured in the image captured by the camera sensor 2000, the processor may detect the object and include the detected object in the image information. In this case, the processor may further supplement the image information by acquiring information on a distance from the object detected through the camera sensor 2000.

The image information may be information on the object captured in the image. The camera sensor 2000 may include an image sensor and an image processing module.

The camera sensor 2000 may process still images or moving images obtained by the image sensor (e.g., a complementary metal-oxide semiconductor (CMOS) or a charge-coupled device (CCD)).

The image processing module may process the still images or moving images acquired through the image sensor to extract necessary information, and transmit the extracted information to the processor.

In this case, the camera sensor 2000 may include a stereo camera in order to improve the measurement accuracy of the object and further secure information such as a distance between the vehicle 700 and the object, but the present invention is not limited thereto.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera actuator, comprising:

a housing including a first side portion and a second side portion corresponding to the first side portion;

a first lens assembly and a second lens assembly that move in an optical axis direction with respect to the housing;

a driving unit configured to move the first lens assembly and the second lens assembly;

a guide unit disposed adjacent to at least one of the first side portion or the second side portion; and at least one ball positioned at the guide unit, wherein at least one of the first lens assembly or the second lens assembly includes a recess which faces the guide unit and in which the at least one ball is seated, and wherein the recess includes a first stepped portion recessed from a surface of the at least one of the first lens assembly or the second lens assembly and disposed along an edge of the recess, and a second stepped portion recessed from a first bottom surface of the first stepped portion so as to be disposed inside of the first stepped portion.

2. The camera actuator of claim 1, wherein the first stepped portion has a closed loop shape.

3. The camera actuator of claim 1, wherein a maximum width of the first stepped portion is larger than a maximum width of the second stepped portion.

4. The camera actuator of claim 1, wherein the at least one ball includes a first ball disposed on an upper side portion of the first lens assembly, and a second ball disposed on a lower side portion thereof.

5. The camera actuator of claim 4, wherein the first ball and the second ball are seated in and come into contact with the second stepped portion.

6. The camera actuator of claim 1, wherein a height of the first stepped portion is smaller than a height of the second stepped portion.

7. The camera actuator of claim 1, wherein the first stepped portion includes a first side surface and the first bottom surface in contact with an inner side of the first side surface, and wherein the second stepped portion includes a second side surface in contact with an inner side of and recessed from the first bottom surface, and a second bottom surface in contact with an inner side of the second side surface.

8. The camera actuator of claim 7, wherein the first side surface surrounds the first bottom surface, the second side surface, and the second bottom surface.

9. The camera actuator of claim 1, wherein a length of the recess in a longitudinal direction is larger than a length thereof in a width direction.

10. The camera actuator of claim 9, comprising protruding portions disposed in the longitudinal direction with the recess interposed therebetween.

* * * * *